United States Patent [19]

Imoto

[11] Patent Number: 5,335,093

[45] Date of Patent: Aug. 2, 1994

[54] FILM IMAGE READING SYSTEM

[75] Inventor: Yoshiya Imoto, Ebina, Japan

[73] Assignee: Fuji Xerox Co., Ltd., Tokyo, Japan

[21] Appl. No.: 861,399

[22] Filed: Mar. 31, 1992

[30] Foreign Application Priority Data

| Apr. 1, 1991 | [JP] | Japan | 3-068237 |
| Apr. 2, 1991 | [JP] | Japan | 3-069912 |
| Apr. 2, 1991 | [JP] | Japan | 3-069913 |
| Apr. 11, 1991 | [JP] | Japan | 3-068238 |

[51] Int. Cl.$^5$ ............................................ H04N 1/04
[52] U.S. Cl. .................................. 358/487; 358/474
[58] Field of Search ............... 358/471, 474, 487, 494, 358/475, 476; 359/857, 862; 355/45, 44; H04N 1/04

[56] References Cited

U.S. PATENT DOCUMENTS

| 4,656,525 | 4/1987 | Norris | 358/487 |
| 4,857,966 | 8/1989 | Ishii et al. | 355/44 |
| 4,991,030 | 2/1991 | Sato et al. | 358/474 |
| 5,016,044 | 5/1991 | Tokuda | 355/45 |
| 5,113,268 | 5/1992 | Yoshida et al. | 358/474 |

FOREIGN PATENT DOCUMENTS 2-189073  7/1990  Japan .
2-275938 11/1990  Japan .

Primary Examiner—Edward L. Coles, Sr.
Assistant Examiner—Kim Yen Vu
Attorney, Agent, or Firm—Finnegan, Henderson, Farabow, Garrett & Dunner

[57] ABSTRACT

A film projector holds film from which an image is projected to a mirror unit and then to a reading unit. A first mirror and a second mirror project the image from the film projector to the mirror unit by a deflecting optical path between the film projector and the mirror unit. A mirror support holds the first and second mirrors and a base supports the film projector and the mirror support. The mirror support is structured so that the second mirror is fixed and the first mirror is rotated integrally with the film projector around the second mirror.

18 Claims, 19 Drawing Sheets

IMAGE AREA

SAMPLING LINE

FILM IMAGE READING SYSTEM

BACKGROUND OF THE INVENTION

The present invention relates to a film image reading system, which comprises a film projector for projecting a film image from film on a projection optical system and a mirror unit for projecting the projected film image of said film projector to a reading unit which outputs a reading copy from a copying machine by projecting the film image on a manuscript reading unit.

In recent years, various types of film image reading systems have been proposed, which read a film image on an ordinary digital color copying machine and output the image as a color copy. In such a system, the film image reading system is combined with the copying machine, where the film image is projected on a manuscript reading unit of the copying machine, and image information is taken up from the manuscript reading unit similarly to a manuscript image on a platen in an copying machine. Further, the image information copy is processed and outputted in the same manner as a copy of a color manuscript. In the following, description will be given on the arrangement and outline of a color copying machine for outputting color copy used in combination with a film image reading system, referring to the examples already proposed by the present applicant (e.g. Japanese Provisional Patent Applications No. 1-8967 and No. 1-99589).

FIG. 16 shows the entire arrangement of a color copying machine provided with a film image reading system.

The color copying machine shown in FIG. 16 is furnished with a base machine 30, which comprises a platen glass 31 where a manuscript is placed on an upper surface thereof, an image input terminal (IIT) 32, an electric system control housing 33, an image output terminal (IOT) 34, a paper tray 35, and a user interface (U/I). As optional items, there are provided an edit pad 61, an auto document feeder (ADF) 62, a sorter 63, and a film image reading system comprising a film projector (F/P) 64 and a mirror unit (M/U) 65.

The image input terminal 32 comprises an imaging unit 37, a wire 38 and a driving pulley 39. By a color filter in the imaging unit 37, the color of the image is separated to primary colors of B (blue), G (green) and R (red) of light. Image information of the color manuscript read by a CCD line sensor is converted to multi-gradation digital image signal BGR and is outputted to an image processing system. The image processing system is accommodated in the electric system control housing 33 and performs various process such as conversion, compensating, editing, etc. in order to improve color, gradation, fineness and other picture quality and reproducibility by inputting image signal of BGR. The image color is converted to primary colors of toner of Y (yellow), M (magenta), C (cyan) and K (black). Gradation toner signal of process color is converted to on/off binary toner signals and is outputted to the image output terminal 34. The image output terminal 34 is provided with a scanner 40 and a photosensitive belt 41, and the image signal is converted to an optical signal at a laser output unit 40a. A latent image corresponding to the manuscript image is formed on the photosensitive belt 41 through a polygon mirror 40b, F/θ lens 40c and a reflection mirror 40d, and the image is transferred to paper carried from a paper tray 35, and a color copy is discharged.

In the image output terminal 34, the photosensitive belt 41 is driven by a driving pulley 41a, and a cleaner 41b, a charger 41c, a developer 41d each for Y, M, C and K, and a transfer unit 41e are arranged around it, and a transfer system 42 is provided face-to-face to the transfer unit 41e. The paper sent from the paper tray 35 through paper carrying route 35a is caught. In case of a 4-color full-color copy, the transfer system 42 is rotated by 4 turns to transfer each latent image of YMCK on the paper. Then, the paper is fixed by a fixer 45 by sending it from the transfer system 42 through a vacuum carrier 43 and is discharged. SSI (single sheet inserter) 35b is to selectively feed paper manually to the paper carrying route 35a.

On the user interface 36, the user selects the desired function and instructs the condition for execution. It is provided with a color display 51 and a hard control panel 52. Direct instruction can be given by soft button on screen in combination with an infrared touch board 53.

The electric system control housing 33 is to accommodate a plurality of control boards arranged for each processing unit such as the image input terminal 32, the image output terminal 34, the user interface 36, the image processing system, the film projector 64, etc., and further, MCB boards (machine control boards) for controlling the operation of mechanisms such as the image output terminal 34, the automatic manuscript feeder 62, the sorter 63, etc., and SYS board for controlling the entire system.

Next, description will be given on the film projector 64 and the mirror unit 65, which constitute the film image reading system.

FIG. 17 represents perspective views of a film projector and a mirror unit, which constitute a film image reading system, and FIG. 18 is a schematical block diagram of the film image reading system.

As shown in FIG. 17(a), the film projector 64 is provided with a housing 601, and an operation checking lamp 602, a manual lamp switch 603, an auto-focus/-manual-focus changeover switch (AF/MF changeover switch) 604, and manual-focus operation switches (M/F operation switches) 605a and 605b are furnished in the housing 601. Also, the housing 601 is provided with a closing unit 606 to open or close freely. On the top and the side of the closing unit 606, there are provided holes 608 and 609, through which a film holding case 607 for holding a manuscript film 633 is inserted from longitudinal or lateral direction into the housing 601 depending on how an object on the manuscript film 633 is photographed.

The film holding case 607 is furnished with a case for 35 mm negative film and a case of positive film, and the film projector 64 can match any of these films, and further, with negative films of 6 cm × 6 cm or 4 inch × 5 inch. The negative film is closely attached on a platen glass 31 between the mirror unit 65 and the platen glass 31.

As shown in FIG. 17(a), the mirror unit 65 is provided with a bottom plate 627 and a cover 628, one end of which is rotatably mounted on the bottom plate 627. Between the bottom plate 627 and the cover 628, a pair of supporters 629 and 629 are pivotally supported, and these supporters 629 and 629 support the cover 628 in such manner that the cover 628 and the bottom plate 627 form an angle of 45 degrees when the cover 628 is opened to the furthest extent.

A mirror 630 is mounted on rear side of the cover 628. A wide opening is formed on the bottom plate 627, and there are provided a Fresnel lens and a diffusion plate 632 as if they close the opening.

The Fresnel lens 631 and the diffusion plate 632 are made of a single acrylic resin plate. Fresnel lens 631 is formed on front surface of the acrylic resin plate, and the diffusion plate 632 is furnished on rear surface thereof. Fresnel lens 631 changes projected light, which is reflected by the mirror 630 and is going to diffuse to parallel beams, and prevents the darkening of peripheral portion of the image. The diffusion plate 632 also serves to diffuse the parallel beams to the slightest extent so that the shadow of Selfoc lens 224 in the imaging unit 37, forming by parallel beams from Fresnel lens 631, is not detected by a line sensor 226.

As shown in FIG. 18, a reflector 612 and a light source lamp 613 made of a halogen lamp are arranged in the housing 601 coaxially with a projection lens 610. Near the lamp 613, a cooling fan 614 for cooling the lamp 613 is furnished. Further, to the right of the lamp 613, there are provided coaxially with the projection lens 610, an aspherical lens 615 for converging light from the lamp 613, a heat absorbing filter 616 for cutting the light beam of a predetermined wavelength and a convex lens 617.

To the right of the convex lens 617, there is provided a compensating filter automatic replacing unit, which comprises a compensating filter holding member 618 for supporting a compensating filter 635 (A compensating filter for one of films is shown in the figure.), adjusting film density for 35 mm negative film and positive film, a driving motor 619 of the compensating filter holding member 618, and a first and a second position detection sensors 620 and 621 for detecting rotational position of the compensating filter holding member 618, and a control unit (provided in the film projector 64, but not shown) for controlling the driving motor 619. Of the compensating filters supported by the compensating filter holding member 618, a compensating filter 635 corresponding to the manuscript film 633 is automatically selected and is coordinated to a position coaxial with each of the lenses such as projection lens 610. The compensating filter 635 of this compensating filter automatic replacing unit can be arranged at any point on optical axis of the projected light, e.g. between the platen glass 31 and the imaging unit 37.

Further, there are provided a light emitter 623 for auto-focus sensor interlocked with a projection lens holding member 611 and a photodetector 624, and an auto-focus unit equipped with a sliding motor 625 for sliding the projection lens holding member 611 of the projection lens 610 with respect to the housing 601. When the film holding case 607 is inserted into the housing 601 through the holes 608 or 609, the manuscript film 633 supported by the film holding case 607 is positioned between the compensating film holding member 618 and the light emitter 623 or the photodetector 624. Near the setting position of the manuscript film 635, a film cooling fan 626 for cooling the manuscript film 633 is furnished.

Auto-fucus function (AF function) is to automatically focus when the manuscript 633 is placed in the film projector 64, and it is carried out as follows:

By turning to film projector mode through the key operation on display of a user interface 36, the light emitter 623 emits light. By selecting the AF/MF changeover switch 604 of the film projector 64 to AF, AF unit is ready to operate. When the film case 607 with the manuscript film 633 is placed in the film projector 64, the light from the light emitter 623 is reflected by the manuscript film 633, and the reflected light is detected by the photodetector 624 of 2-element type for AF.

The two elements of the photodetector 624 issue signals corresponding to the quantity of the detected reflected light. The difference between these signals is processed by analog computation by an analog comparator. If the result of the computation is not 0, output signal is issued, and a motor 625 is driven toward a direction to decrease the difference between the signals from the two elements. Therefore, when the projection lens holding member 611 is slid, the light emitter 623 and the photodetector 624 also move. When the difference between output signals from two elements turns to 0, CPU 634 stops the motor 625. The moment when the motor 625 stops is the moment of correct focusing.

Thus, AF operation is carried out. When the film case with the manuscript film is placed in the film projector 64, there is no need to focus manually each time. This not only saves working procedure but also prevents copying failure due to incorrect focusing.

In processing the image signal, a line sensor 226 reads projected light of an image of the manuscript 633 in analog as light quantity for R, G and B as shown in FIG. 18, and the image signal expressed by the light quantity is amplified to a desired level by an amplifier 231. The amplified image signal is converted to digital signal by an A/D converter 235 and is further converted to density signal from light quantity signal by a log converter 238.

The image signal given in density is compensated for shading by a shading compensation circuit 239. By this shading compensation, the image signal is cleared from uneven light quantity on Selfoc lens 224, uneven sensitivity of each pixel in the line sensor 226, variations in spectral characteristics and light quantity level in compensating filter or lamp 613, and the influence of the changes over time.

Prior to the shading compensation, if the above three types of film and registered film are selected as the manuscript film, the compensating filter is set to the filter for positive film, and light quantity signal from the lamp 613 is read with the manuscript film 633 not placed in position. After amplifying the signal and converting to digital signal, the data obtained from the data converted to density signal are stored in a line memory 240 as reference data. Specifically, the imaging unit 37 is sampled by 16-line step scanning for each pixel of R, G and B, and these sampling data are sent to CPU 634 through the line memory 240. CPU 634 computes average density value of each pixel of the sampling data of 16 lines and obtains shading data. By this averaging, influence of dust and the like on diffusion plate contained on the read data for each line can be reduced.

When the manuscript film is positioned in place and the image of the manuscript film is read, CPU 634 computes density adjustment value $D_{ADj}$ from density data of negative film memorized in ROM, and $D_{ADj}$ value set in register of LSI in the shading compensation circuit 239 is altered. Further, CPU 634 adjusts light quantity of the lamp 613 and gain of the amplifier 643 according to the selected film.

The shading compensation circuit 239 shifts the density value by adding $D_{ADj}$ value to actual data read from the manuscript film. Further, the shading compensation circuit 239 performs shading compensation by drawing the shading data for each pixel from the adjusted data. When shading compensation is completed, the image input terminal 32 issues density signals of R, G and B to the image processing system 33. Based on actual data of the manuscript film, CPU 634 selects END curve, and compensating signal for $\gamma$ compensation is issued according to the selected curve. By this compensating signal, the image processing system 33 performs $\gamma$ compensation and corrects that $\gamma$ is not 1 in the manuscript film or vague contrast due to non-linear characteristics. Further, negative image is converted to positive image.

When copying is to be made on paper of maximum size, e.g. A3 size paper in a copying machine, the paper is longer in lateral direction. For this reason, if a film image is projected to read image information and is to be copied, it is necessary to obtain the projected image in the lateral direction to match the direction of the paper. However, even in case copying is to be made on A3 size paper longer in lateral direction, if copying is made only on one-half of one side, the projected image must be in longitudinal direction. In case two or more copies are made on A4 size paper, copying can be made at higher copying speed (cpm) when the paper is placed longer in longitudinal direction to obtain a longitudinal projected image than a lateral projection image.

For this reason, in a conventional type film image reading system to output color copies of film image, holes 608 and 609 are provided on upper and lower surfaces and left and right surfaces of the closing unit 606 of the housing 601 in order that longitudinal and lateral projection images can be obtained to match paper size and the direction of the paper. As the result, the film holding case 607 can be inserted into the housing 601 both from longitudinal and lateral directions. This causes the problem of dead space and the housing 601 needs to be larger. Particularly, in case of longitudinal projection, the film holding case 607 enters deep below the film projector 64. If other structures such as sorter are optionally installed as in the conventional case, interference with these structures occurs, and system layout is changed.

Further, film image is often inclined due to the conditions at the time of photographing. When such inclined film image is to be copied, it is possible according to the conventional type film image reading system only to select either longitudinal or lateral projection, and it is not possible to rotate the image as desired. In a real time combination with a copying machine, even when it is attempted to copy by overlapping the film image on a predetermined area of the manuscript using editing function, the film image can be only turned in longitudinal or lateral direction, and it cannot be inclined. This restricts the degree of freedom in editing. To achieve image rotation, image processing for rotating the image must be carried out in an image processing system, and this leads to more complicated and troublesome data processing.

In a film image reading system where it is possible to rotate the image, when a scaling-down optical system is combined with the film image reading system, optical image is too dark on the projection plane and it is difficult to confirm rotating angle of the image. To check whether the desired image rotating angle has been obtained or not, it is necessary to make the checking of the image easier by placing a piece of white paper below Fresnel lens.

As described above, in the film image reading system, a mirror unit is set at a predetermined distance from the film projector in order to maintain necessary optical path and to project the projection image of the film projector on a reading unit. Thus, when the film image reading system is not used, the mirror unit causes a mess and there arises a problem of space.

Moreover, in a conventional type film image reading system, auto-focus function is provided, in which focusing is performed through partial feedback system using an analog comparator so that the positional relation between the film and the lens is kept at constant level by a position detection sensor comprising of a light emitter and a photodetector using reflected light as described above. Because the feedback loop is small, response time is short. Because no intervention of software is required, there is no need to think about convergence. Further, because response time is short, auto-focusing can be performed for each copy even when two or more copies are needed. Also, warping of film due to heat can be reduced. However, to obtain maximum resolution, it is necessary to perform initial adjustment for adjusting relative position of lens and auto-focus optical system to attain the optimal focusing at the position under control of manual feedback system.

However, in manual focusing, an image of the manuscript film 633 is projected on a diffusion plate 632 of the mirror unit 65, which is set at a predetermined position of the platen glass 31, and the projection lens holding member 611 is slid while watching the projected image. Accordingly, the image projected on the diffusion plate 632 is faint and difficult to discern, and it is very difficult to focus correctly. When it is attempted to achieve the best focusing by independently controlling the relations of film-lens and lens-projection plane, projection scale is not constant any more.

SUMMARY OF THE INVENTION

It is an object of the present invention to provide a system, by which it is possible to readily give instruction on image rotation and to rotate film image. It is another object of the present invention to provide a system, by which an operator can easily rotate an image. It is still another object of the invention to provide a system for achieving free rotating of a projected image.

It is yet another object of the invention to reduce the space for film holding case and to provide compact arrangement for a housing of a film projector. It is yet another object of the invention to provide a system, in which a mirror unit can be stored easily and in compact arrangement so that necessary optical path can be maintained. It is still another object of the invention to provide easier setting of the mirror unit.

It is another object of the invention to simplify initial adjustment of auto-focusing.

To attain the above objects, the film image reading system according to the present invention comprises a film projector for holding film and projecting a film image, a mirror unit for projecting a projected image of said film projector to a reading unit, a first and a second mirrors for projecting said projection image from said film projector to said mirror unit by deflecting optial axis on optical path between said film projector and said mirror unit, mirror holding means for holding said first mirror and said second mirror, and a base for placing said film projector and said mirror holding means, and it is characterized in that the mirror holding means is installed in such manner that the second mirror is fixed and the first mirror is rotated integrally with the film projector around said second mirror, there is provided adjusting means for adjusting swinging of the first and the second mirror, and swing adjustment value of the first and the second mirrors is obtained from locus of the projected image of film center rotated by a predetermined angle.

The system according to the present invention is also characterized in that the space within a base is used as a space for storing the mirror unit, there are provided an extension type guide rail and a shutter for projection optical path for shielding projection path of the second mirror, said mirror unit is dropped into a storage space while it is drawn out, and the movement of the mirror unit to storage space pushes it to a position for shielding the projection path of the second mirror.

Further, the invention is characterized in that said film image reading system is combined with an image output unit for reading image information and for copying, and when an information for rotating the image is specified according to the copy of the projected image, rotating angle is obtained by said rotating information and the projection image is rotated.

Further, the invention is characterized in that there are provided a light emitter for irradiating light on film and a photodetector for receiving light reflected from the film, first adjusting means for keeping distance between the lens and the film at constant level, and second adjusting means for adjusting said constant distance to a distance to obtain optimal resolution through feedback of video signal of the reading unit.

By the above arrangement, there are provided a film projector for holding the film and for projecting film image, a mirror unit for projecting a projected image of said film projector to a reading unit, a first and a second mirrors for projecting said projected image from said film projector to said mirror unit by deflecting optical axis on the optical path between said film projector and said mirror unit, mirror holding means for holding said first mirror and said second mirror, and a base for placing said film projector and said mirror holding means. Accordingly, the projection main body is moved upward, and it is possible to provide compact and sufficient optical path. Moreover, it is possible to keep an adequate storage space for the mirror unit because a space can be provided below.

The mirror holding means is installed in such manner that the second mirror is fixed and the first mirror is rotated integrally with the film projector around said second mirror. Thus, it is possible to freely rotate the projected image by changing the rotating angle. Also, adjusting means for adjusting swing of the first and the second mirror is provided, and swing adjusting value of the first and the second mirrors can be obtained of the locus of the projected image of film center when the film projector and the first mirror are rotated by a predetermined angle. Thus, adjustment can be made easier even when two mirrors are combined.

Further, the invention comprises a light emitter for irradiating light to film and a photodetector for receiving the reflected light from film, and there are provided first adjusting means for keeping the distance between a lens and the film at constant level, and second adjusting means for adjusting said constant distance to a distance to obtain optimal resolution through feedback of video signal of the reading unit. Thus, the initial adjustment of auto-focus optical system can be easily carried out.

Still other objects and advantage of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
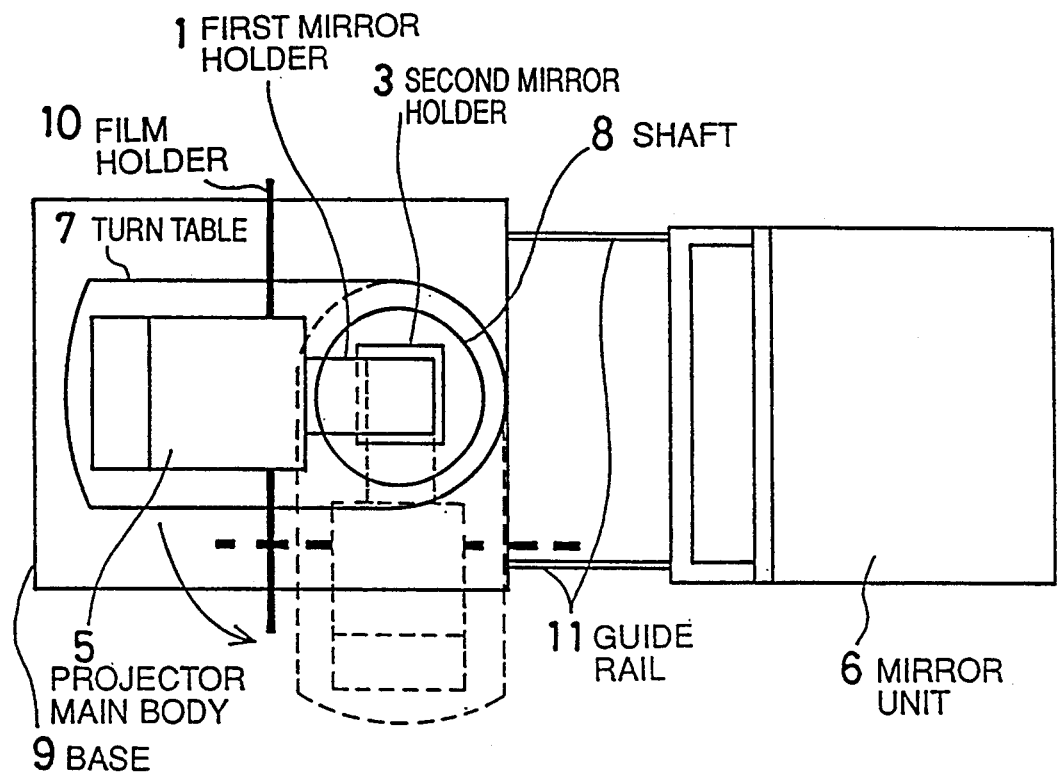
FIG. 1a and FIG. 1b show an embodiment of a film image reading system according to the present invention.
Figure 1B:
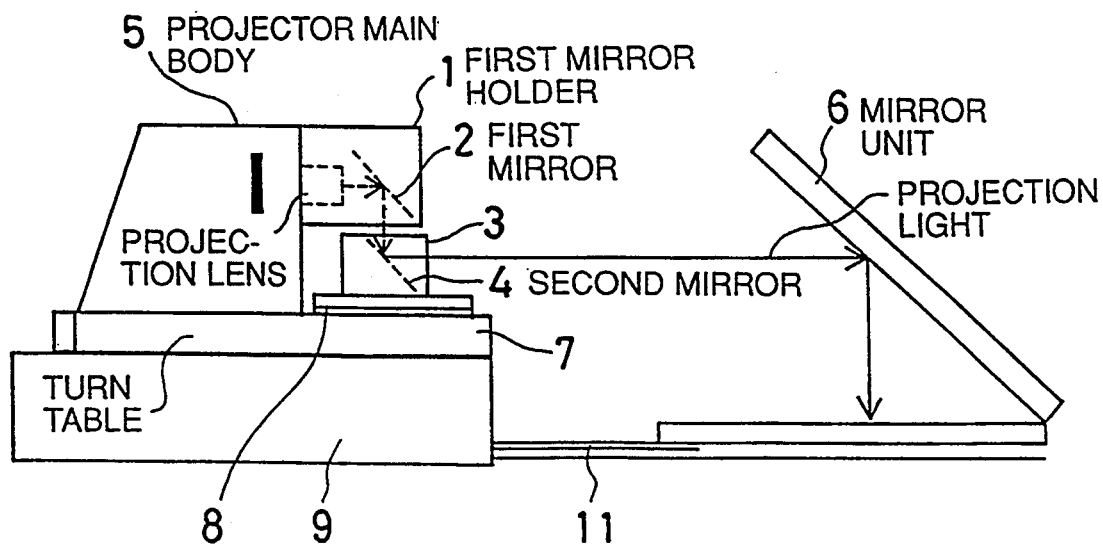

In FIG. 1, a first mirror holder 1 and a second mirror holder 3 hold a first mirror 2 and a second mirror 4 respectively, which are inclined by 45° from horizontal line and are arranged along optical path between a film projector main body 5 and a mirror unit 6 in order to deflect optical axis and to project a projected light of the film projector main body 5 through the first mirror 2 and the second mirror 4 to the mirror unit 6. As shown in FIG. 1(b), the second mirror holder 3 is fixed on a shaft 8 mounted on a base of the film projector immediately below the first mirror holder 1 (the first mirror 2). A turntable 7 is pivotally supported by the shaft 8 at the center of the second mirror 4 and is rotated, and the first mirror holder 1 is integrally fixed with the film projector main body 5 on it. Therefore, the turntable 7 is rotated around the shaft 8 while the second mirror 4 is fixed on the shaft 8, and the film projector main body 5 placed on it and the first mirror 2 mounted on it are integrally rotated.

As described above, the first mirror holder 1 is integrally fixed with the film projector main body 5 on the turntable 7 in order that the first mirror 2 is held in front of a projection lens of the film projector main body 5. Thus, as shown in FIG. 1(b), the projected image of the film projector main body 5 is projected to the second mirror 4 immediately below by the first mirror 2. It is further projected to the mirror unit 6 ahead by the second mirror 4. Moreover, this projected image can be rotated from longitudinal to lateral directions or toward inclined direction by rotating the turntable 7 as shown by dotted line in FIG. 1(a). FIG. 2 shows how the projected image is rotated.

Figure 2A:
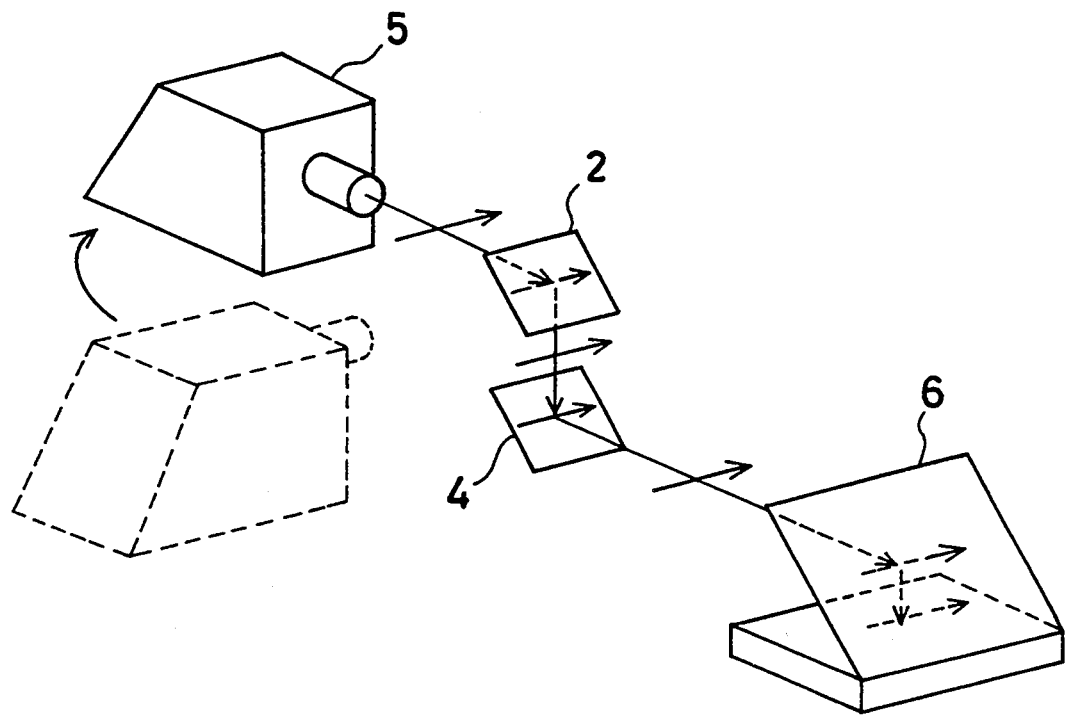
FIG. 2a and FIG. 2b are drawings for explaining rotation of a projected image.
Figure 2B:
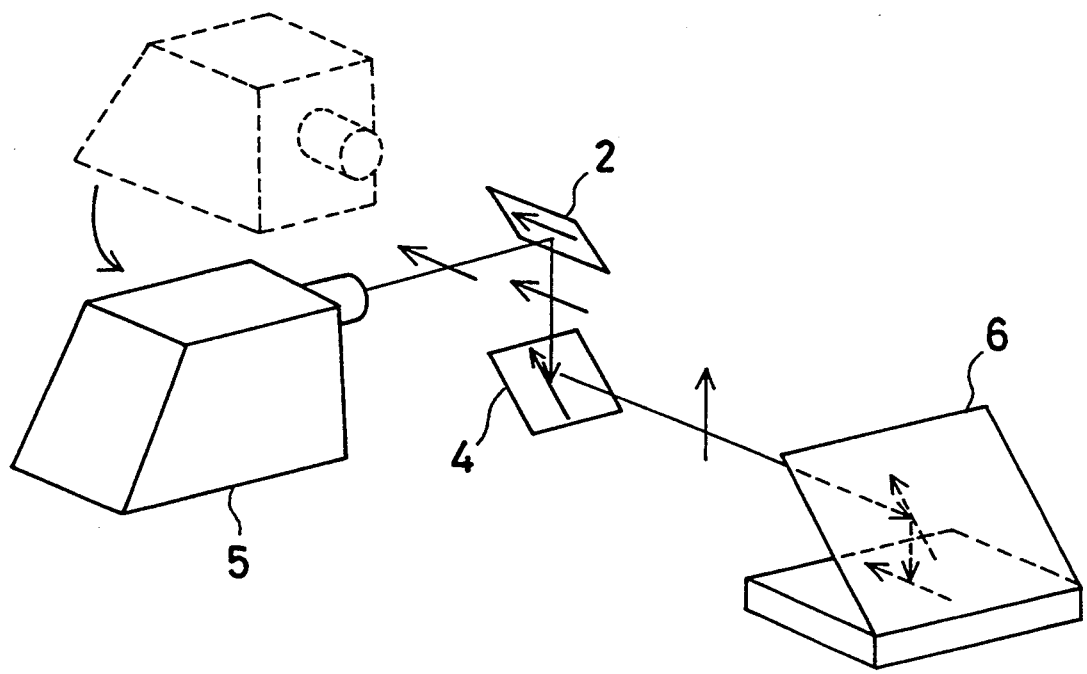

When the rotating angle of the turntable 7 is 0°, the first mirror 2 and the second mirror 4 are inclined by 45° in the same direction as shown in FIG. 2(a), and a projected image of the film projector main body 5 in lateral direction is projected in lateral direction to the mirror unit 6. However, when the turntable 7 is rotated by 90°, the first mirror 2 is rotated integrally with the film projector main body 5 around the second mirror 4 as shown in FIG. 2(b), and projected image of the film projector main body 5 in lateral direction, for example, is rotated in longitudinal direction and is projected to the mirror unit 6. That is, if the condition of FIG. 2(a) is lateral projection as called in the past, longitudinal projection can be achieved by turning to the condition of FIG. 2(b). Further, when the rotating angle of the turntable 7 is changed as desired, the projected image of the film projector main body 5 is rotated according to the rotating angle, and the projected image rotated by an desired angle is projected on the mirror unit 6.

In the film image reading system of the present invention, optical axis is deflected by two mirrors as described above, and there is high degree of freedom for adjusting these mirrors. Therefore, when these are independently adjusted, it is difficult to adjust to the initial angle of 45°. If there is deviation, the center of the projected image is deviated when the film projector and the first mirror is integrally rotated. Thus, film image is not projected to initial projection position of longitudinal and lateral projections, and the image does not come to the desired position on a copy. It is difficult to adjust this by trial and error because these two mirrors have degree of freedom for adjustment respectively.

Figure 3A:
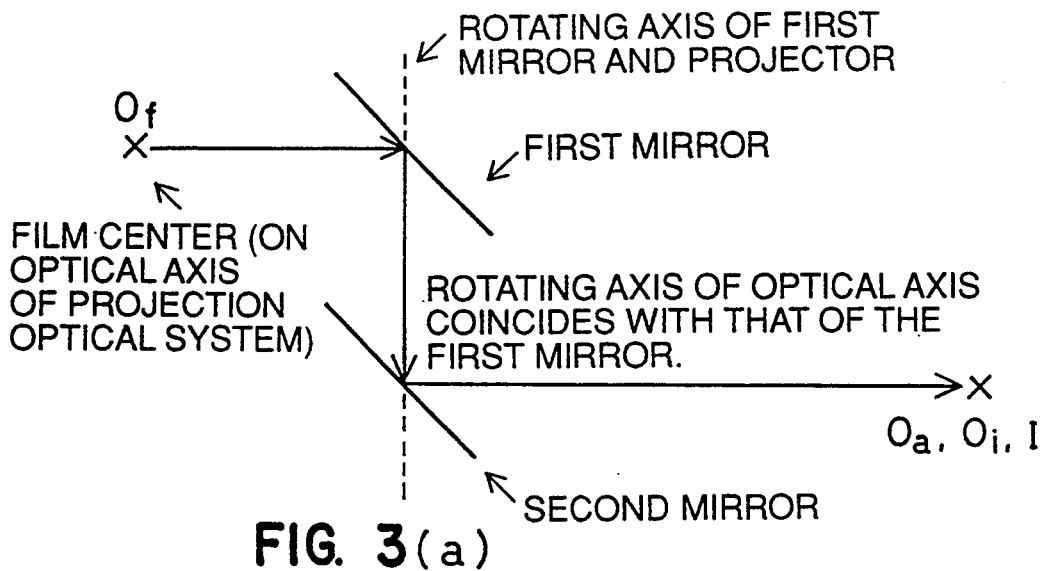
FIGS. 3a through 3e are to explain the relationship between setting deviation of mirrors and movement of the projected image as well as swing adjustment value.

Here, it is supposed that the center of the film on optical axis in the projection optical system is $O_f$, the center of the projected area is $O_a$, the projected image of the center of the film is I, and rotating center of the projected image is $O_i$. If the first and the second mirrors are perfectly set, and the optical axis coincides with the rotating shaft of the first mirror, and the projected image i of the film center is projected to the center $O_a$ of the projected area as shown in FIG. 3(a). For this reason, even when the first mirror is rotated, the center $O_a$ of the projected area is turned to be the rotating center $O_i$ of the image, and the projected image I of the film center does not move.

Figure 3B:
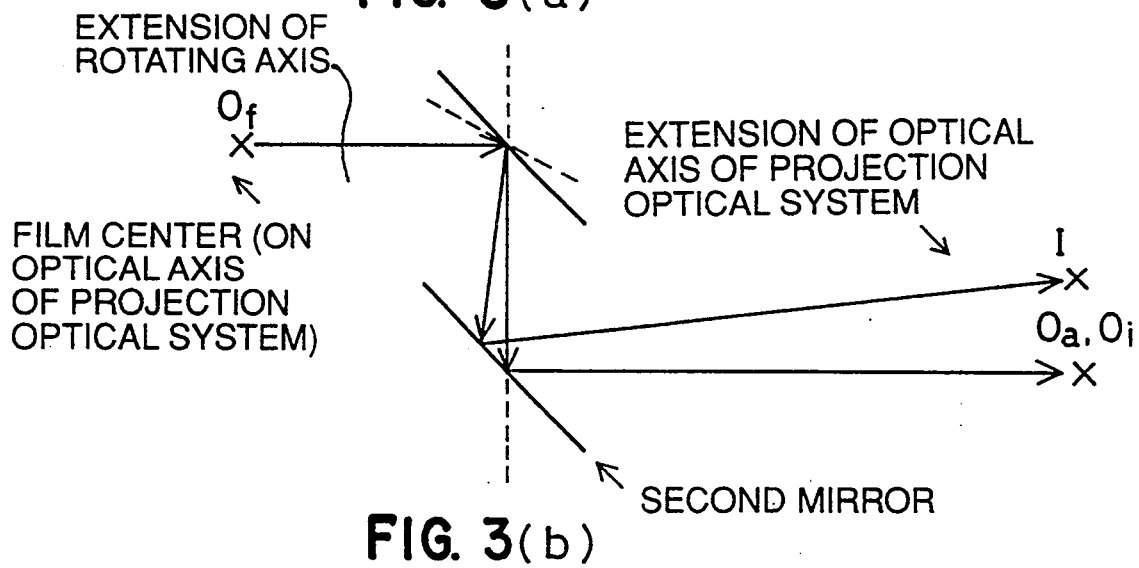
Figure 3C:
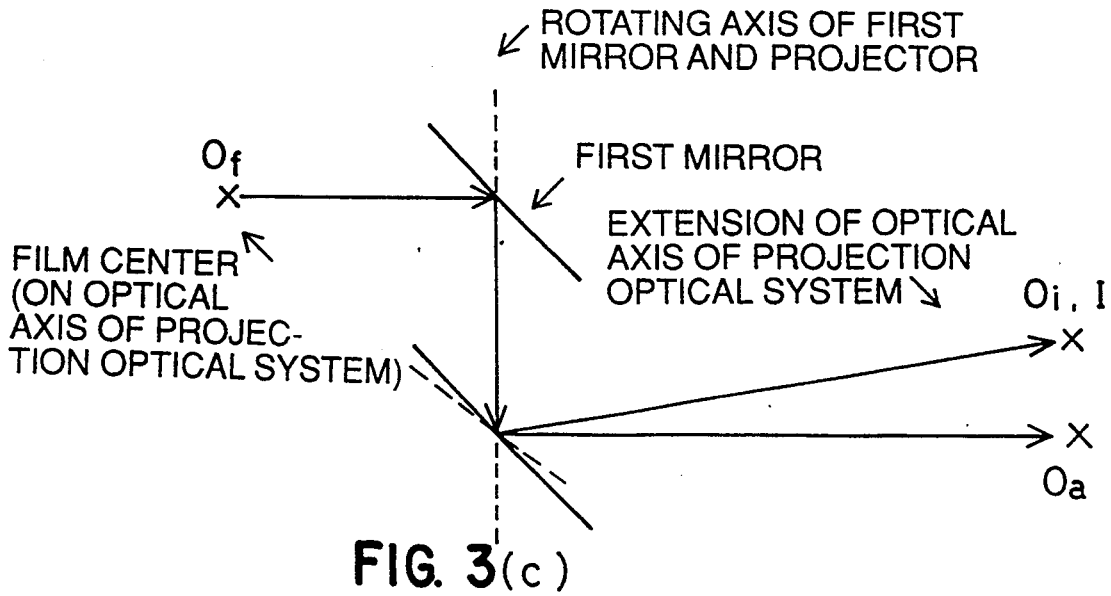
Figure 3D:
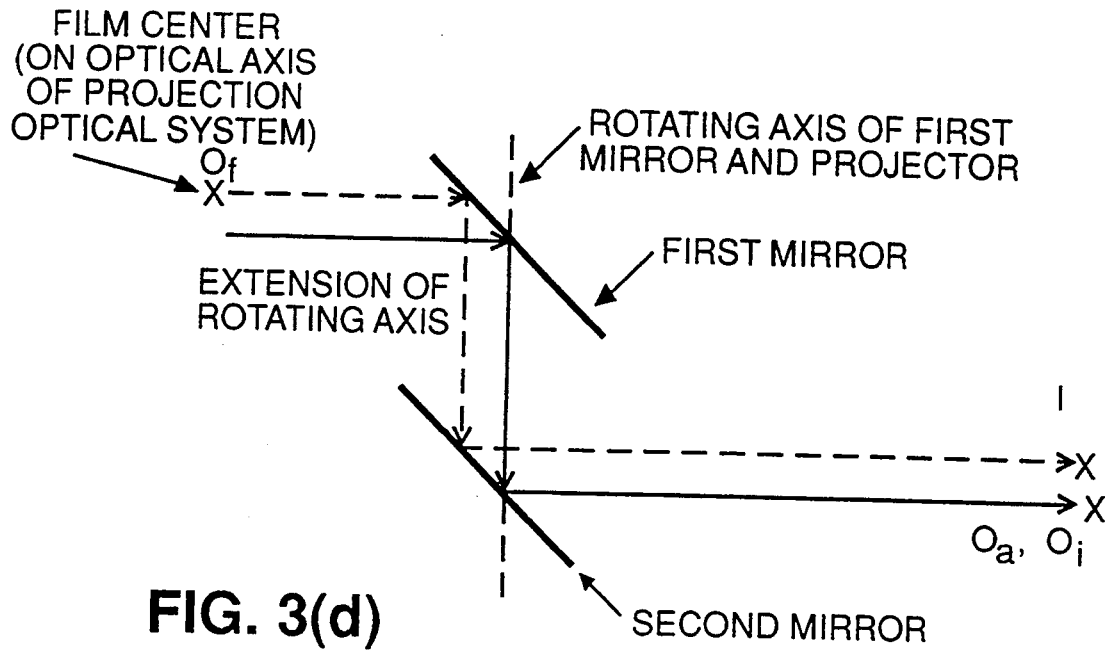

However, when angle of the first mirror is deviated from normal angle as shown in FIG. 3(b), the rotating center $O_i$ of the projected image on the projected area due to rotating of the first mirror does not move from the center $O_a$ of the projected area, but the projected image I of the film center moves. Similarly, as shown in FIG. 3(c), if angle of the second mirror is deviated from normal angle, the rotating center $O_i$ of the projected image and the projected image I of the film center coincide with each other but move from the center $O_a$ of the projected area.

When the extension of the rotating axis of the first mirror and the film projector is deviated in parallel from optical axis of the film projector as shown in FIG. 3 (d), the rotating center $O_i$ of the projected image does not move from the center $O_a$ of the projected area, but the projected image I of the film center moves. In this case, the same phenomenon as in FIG. 3(b) occurs, and it is difficult to differentiate, but adjustment may be made by the angle of the first mirror. In this case, the projected image is tilted with respect to the projection plane because the setting is different from the initial one. The above deviation is determined by mechanical tolerance, and it is 1 mm at maximum. If it is set to the maximum value of 1 mm, the deviation on the projection plane is also 1 mm. Because the tilted angle of the image by adjustment of the first mirror is 1/500 (rad), only about ¼ mm in floating amount, and depth of focus is within the range of 2-1 mm, and there is no problem with performance. Therefore, there is no substantial problem.

The influence by parallel movement from the other normal position of mirrors can be absorbed by angle adjustment of the first and the second mirrors. Even when the film projector main body swings, it can be absorbed by swing adjustment of the first mirror.

Thus, the setting deviation can be determined from the positional relationship of the rotating center $O_i$ of the projected image, the projected image I of the film center, and the center of the projected area $O_a$ when the first mirror is rotated. The swing angle can be adjusted as shown in FIG. 3(e).

Figure 3E:
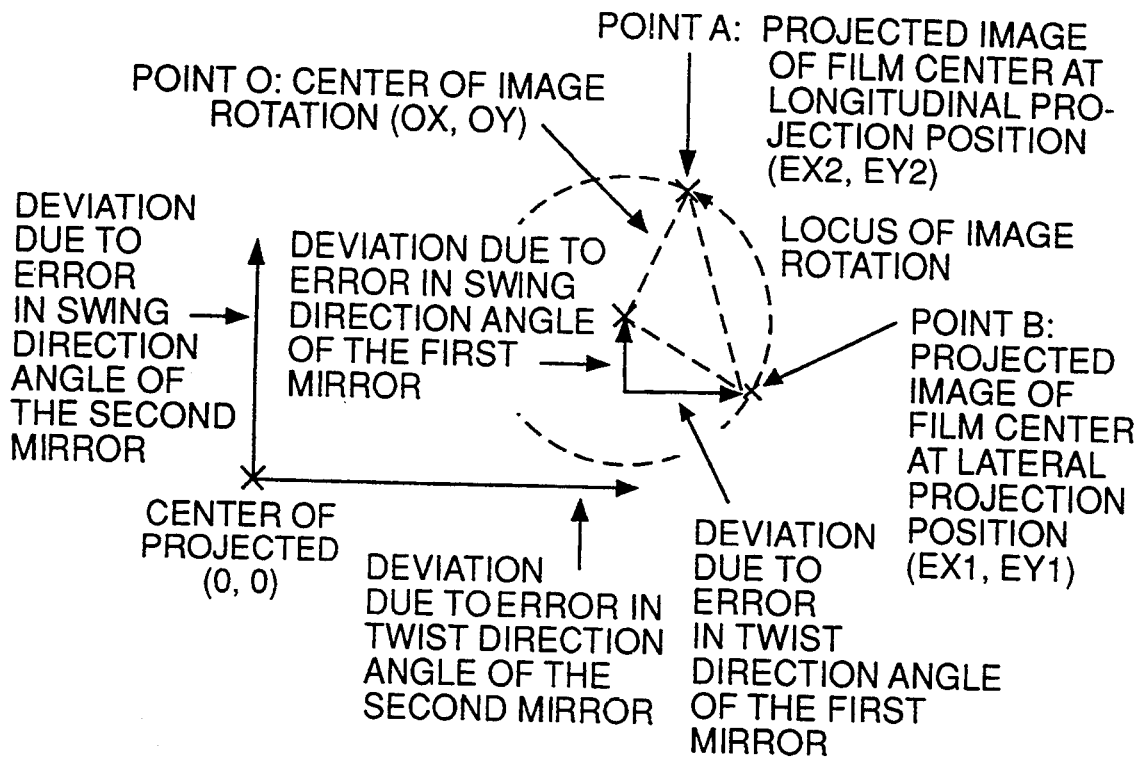

In the adjustment of swing angle, a point B (EX1, EY1) of a projected image of the film center at lateral projection position as shown in FIG. 3(e) and a point A (EX2, EY2) of a projected image of the film center at longitudinal projection position by rotating the image by 90° are obtained. After seeking the rotating center $O_i$(OX, OY) of the projected image from two points A and B, deviation $\Xi X1$ due to error of twisting direction angle of the first mirror and deviation $\Xi Y1$ due to error in swing direction angle are obtained from the rotating center $O_i$ of the projected image (OX, OY) and from the point A (EX2, EY2) or the point B (EX1, EY1) of the projected image of the film center. Further, from the center $O_a$ of the projected area (0, 0) and the rotating center $O_i$ (OX, OY) of the projected image, deviation $\Xi X2$ due to error in twisting direction angle of the second mirror and deviation $\Xi Y2$ due to error of swing direction angle are obtained.

In this case, locus of the projected image of the film center caused by image rotation is a circle having the rotating center $O_i$ (OX, OY) of the projected image as its center. The points A and B of the projected image of the film center and the rotating center $O_i$ of the projected image when the image is rotated by 90° from lateral projection position to longitudinal projection position form a right-angled isosceles triangle with these three points as vertexes. Based on this relation, it is possible to obtain the rotating center $O_i$ (OX, OY) of the projected image from the points A and B as follows:

$$OX=(EX_1+EX_2+EY_1-EY_2)/2$$

$$OY+(EX_2+EY_1+EY_2-EX_1)/2$$

As the result, if it is assumed that optical path from the projection plane to the first mirror to be adjusted is L1, the swing angles $\Xi X1$ and $\Xi Y1$ of the first mirror can be calculated from the relation explained in FIG. 3(b) as follows:

$$\Xi X1=(OX-EX1)/2 \cdot L1$$

$$\Xi Y1=(OY-EY1)/2 \cdot L1$$

Also, if it is assumed that optical path from the projection plane to the second mirror to be adjusted is L2, the swing angle $\Xi X2$, $\Xi Y2$ of the second mirror can be calculated from the relation explained in FIG. 3(c) as follows:

$$\Xi X2 = OX/2 \cdot L1$$

$$\Xi Y2 = OY/2 \cdot L1$$

In the processing procedure for the above swing adjustment, the standard target having optical axis center in two ways of longitudinal and lateral projections by iamge rotation of 90° is projected on the platen surface. Deviation is measured from initial position of each point, and swing adjustment values of the first and the second mirrors are calculated from these values. As the adjusting means in this case, the adjusting screws of the first and the second mirrors may be driven by a motor, or a value converted to rotation adjustment value of the adjusting screws such as "2 turns and half" is outputted to a display unit, and the operator may adjust four adjusting screws of the first and the second mirrors by the rotation adjustment value as displayed.

In case the adjustment with high accuracy is required, the burden on the operator is increased, and adjustment may be made according to the magnitude of error of swing angle. For example, if the deviation is higher than the predetermined adjustment value, the above adjusting screws are adjusted. If it is smaller than the predetermined adjustment value, the deviation may be absorbed by the positional adjustment during copying. In the latter case, the deviation of the registered position of the projected image may be calculated and image shift may be performed for compensation by deviation of the registered position by an image processing system before copying.

In the above switch adjustment, it is necessary to detect the center of the projected image in longitudinal and lateral projections. For this purpose, an X-shaped chart as shown in FIG. 4 is used as a standard target at the film center on optical axis of the projection optical system. Through sample scanning by the image input terminal, the projected image i (EX, EY) of the film center is obtained.

Figure 4A:
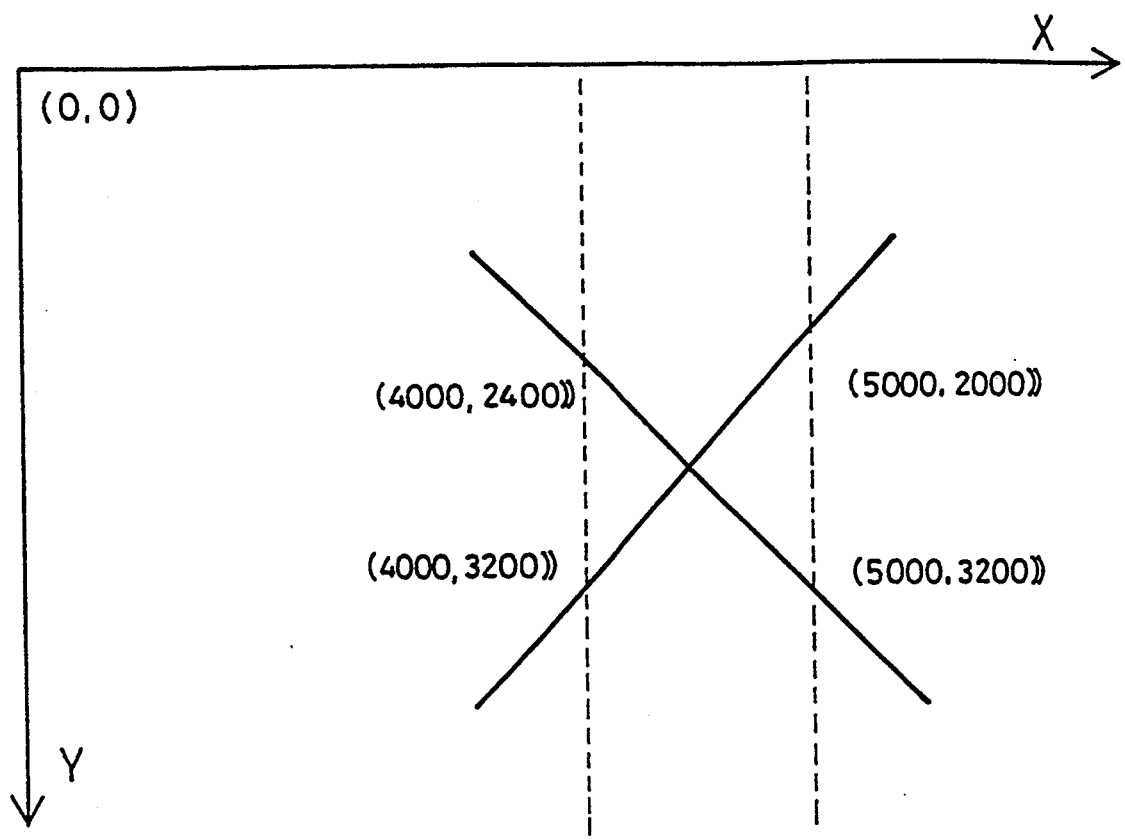
FIG. 4a and FIG. 4b show an example of a standard target.

In this case, if a chart with only one point is used as the reference target, it is necessary to sample many points to detect the position. This increases the burden on the image input terminal. However, when X-shaped chart is used as a reference target as in the present invention, the center can be determined through sample scanning of 2 lines at the minimum as shown in FIG. 4(a). This simplifies the processing for swing adjustment.

For example, as shown in FIG. 4(a), it is assumed that registered origin is (0, 0), and sample scanning is performed by two lines of X=4000 and X=5000 on the coordinates on platen by each step of 1/400 inch, and that the coordinates read on X-shaped chart of the refernece target are 4 coordinates as given on the figure. Then, the center of X-shaped chart can be obtained from simultaneous linear equations as a point of intersection of two straight lines passing through the two points: (4400, 2720).

Figure 4B:
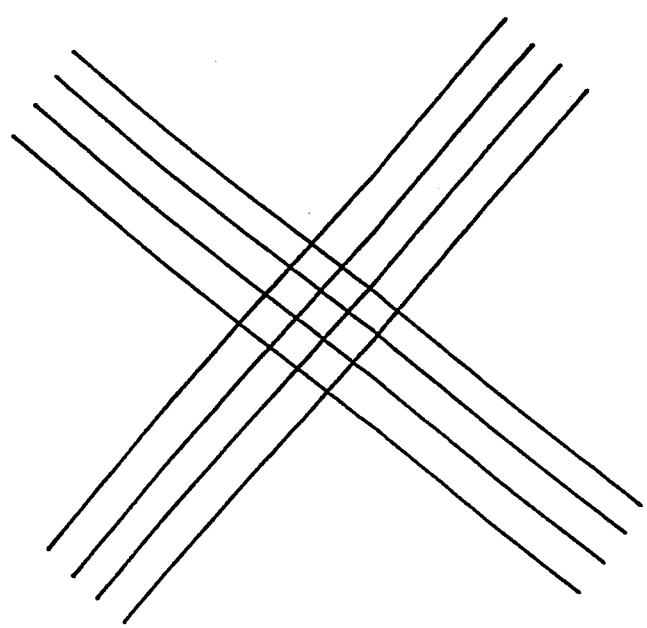

Further, in the X-shaped chart shown in FIG. 4 (a), a part of X-shaped chart cannot be distinguished from dust and the like in the sample scanning, and the influence of noise is likely to occur. Accordingly, the center of X-shaped chart may not be detected accurately in some cases. To solve this problem, X-shaped chart made of pairs of lines as shown in FIG. 4(b) may be used. When the X-shaped chart with pairs of lines is used, the data of X-shaped chart can be distinguished from noise such as dust because of its regularity during sample scanning, and the center of the X-shaped chart can be detected with high accuracy.

The above X-shaped chart with pairs of lines can also be used as an exclusive chart for initial setting of autofocusing. In this case, through sampling near four corners and near the center of the chart, it is possible to set a position with good MTF balance of the entire image, or to detect the inclination of optimal image due to poor mechanical adjustment by detecting poor MTF balance with sampled four corners.

Next, description will be given on an example of a focusing mechanism simultaneously used with the above X-shaped chart.

Figure 5A:
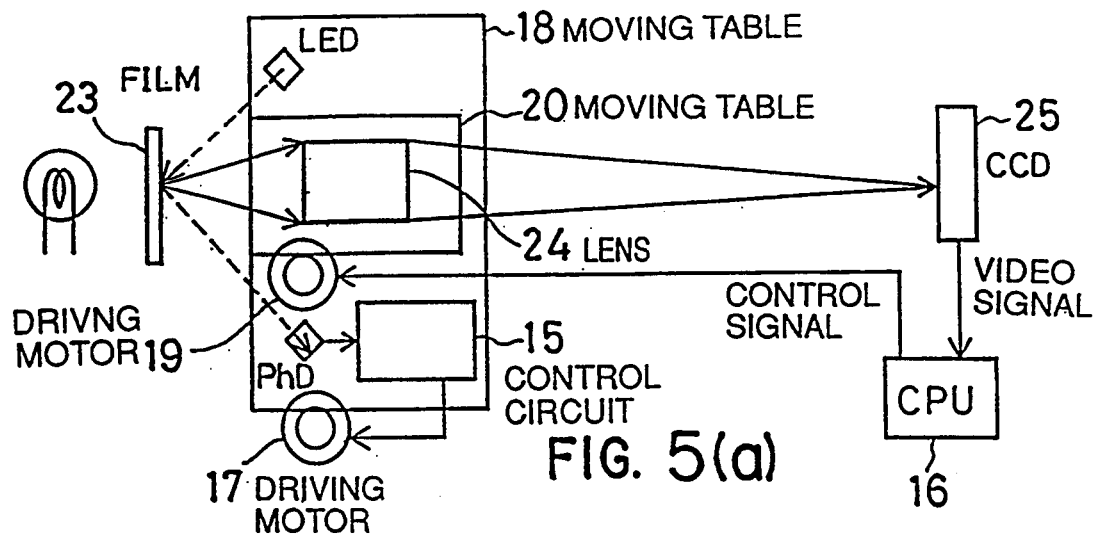
FIGS. 5a through 5c show an embodiment of focus setting mechanism of the film image reading system of the present invention.

In FIG. 5(a), a lens 24 is fixed on a moving table 20, and the moving table 20 is movably mounted on a moving table 18. Here, the moving table 18 is driven by a driving motor 17 to adjust the distance between a film 23 and the moving table 18 where a light emitter LED and a photodetector PhD of auto-focus optical system are provided. The moving table 20 is driven by a driving motor 19 and adjusts the position of the lens 24 between the film 23 and a CCD sensor 25 independently from the position of the moving table 18. A control circuit 15 is means for controlling the driving motor 17 and controls the driving motor 17 using signals of a position detecting sensor, which comprises a light emitter LED and a photodetector PhD mounted on the moving table 18, so that the distance between the film 23 and the moving table 18 is kept at constant level. CPU 16 is means for controlling a driving motor 19 and controls the driving motor 19 in order to feedback video signal read by CCD sensor 25 and to increase resolution of the projected image.

As described above, the present invention comprises a moving table 18 driven and moved by a driving motor 17, and a moving table 20 driven and moved by a driving motor 19 on the moving table 18, and a focus setting mechanism is provided by fixing a lens 24 on the moving table 20. The driving motor 17 is controlled by a light emitter LED, a photodetector PhD and a control circuit 15 furnished on the moving table 18.

It is provided with auto-focus function to maintain the distance between the film and lens at a certain level and to control the driving motor 19 according to the resolution through feedback of video signal of CCD sensor 25 read from the projected image by CPU 16.

When initializing is performed by projecting a special-purpose chart for focus adjustment in adjustment mode on diagnostic using the above focus setting mechanism, the initializing is performed with the lens 24 at the best focusing position on the table 18 with the distance between the moving table 18 and the film 23 kept at constant value. The relationship between the lens 24 and the table 18 is fixed only after the initializing is completed. By these two auto-focus functions, it is possible to provide the best focusing condition to feedback video signal from CCD sensor 25. By the best focusing condition thus obtained, the optical system of PhD-LED follows up with respect to distortion of the film 23 and keeps the position of the table 18 at constant status relative to the film 23. Therefore, the lens 24, the position of which is fixed on the table 18 at the completion of the initializing, can maintain its condition with the film-lens relationship with the best focusing condition unchanged. Thus, it is possible to simplify the initializing of auto-focusing, and the processing time and stability can be improved in auto-focusing during copying only by control of the driving motor 17.

Figure 5B:
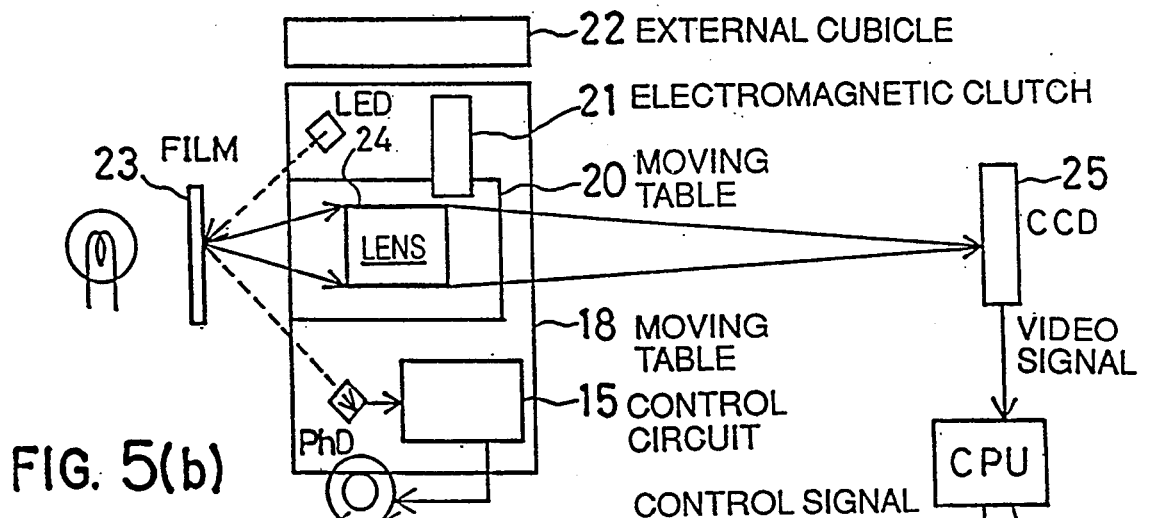
Figure 5C:
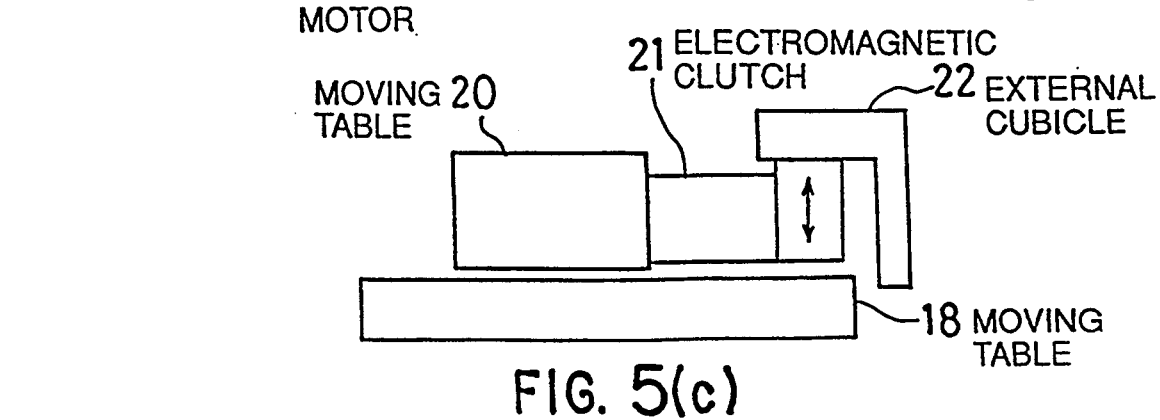

Further, because two driving motors 17 and 19 are used for auto-focusing in the above arrangement, larger mechanism is required. For this reason, the driving of the moving tables may be performed by only one motor 17, switching over the driving of the moving tables by an electromagnetic clutch 21 as shown in FIGS. 5(b) and (c). The electromagnetic clutch 21 shown in FIGS. 5(b) and (c) is to switch over whether the moving table 20 is fixed on an external cubicle 22 or it is fixed on the moving table 18. Specifically, when the moving table 20 is fixed on the external cubicle 22 by the electromagnetic clutch 21 as in the former case, the lens is fixed and the moving table 18 moves. Thus, the positions of the light emitter LED and the photodetector PhD relative to the film 23 are controlled by the control circuit 15. In case the moving table 20 is fixed on the moving table 18 as in the latter case, the position of the lens is controlled by CPU 16. The auto-focusing in this case is performed, for example, by the following procedure.

First, when diagnostic is adjusted, the moving table 20 is fixed on the moving table 18 by the electromagnetic clutch 21, and the driving motor 17 is controlled from CPU 16.

Next, the moving table 20 is fixed on the external cubicle 22 by the electromagnetic clutch 21. With the lens at fixed position, the control of the driving motor 17 is switched over to the control using the light emitter LED and the photodetector PhD, and the moving table 18 is set to correct position for the photodetector PhD.

By fixing again the moving table 20 on the moving table 18 by the electromagnetic clutch 21, the optical system of PhD-LED follows up the best focusing position as adjusted by control signal from CPU, and the best focusing can be maintained at all times.

The initializing of the above auto-focusing can be performed with the initializing of the image rotating center using an X-shaped chart with pairs of lines as shown in FIG. 4.

Figure 9A:
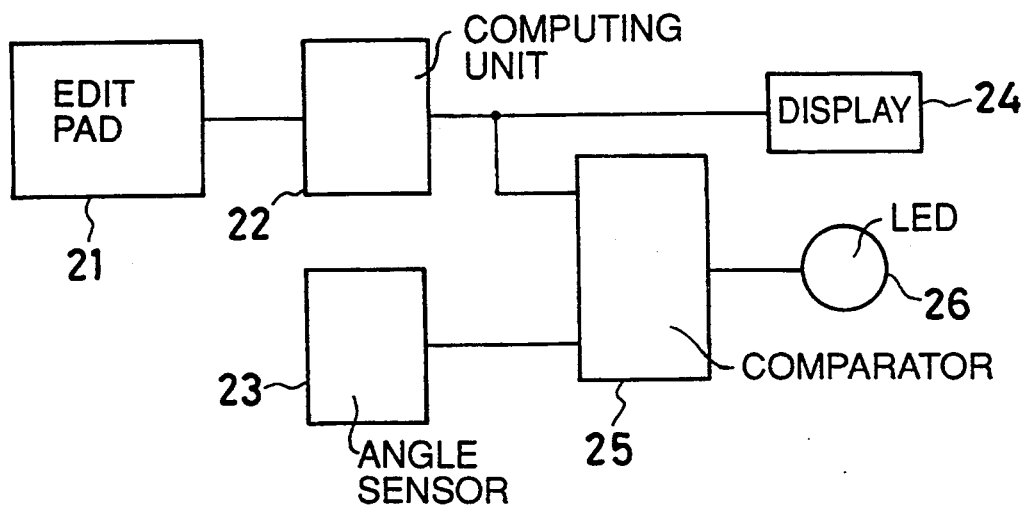
FIGS. 9a and 9b are block diagrams of a control system for image rotation.
Figure 9B:
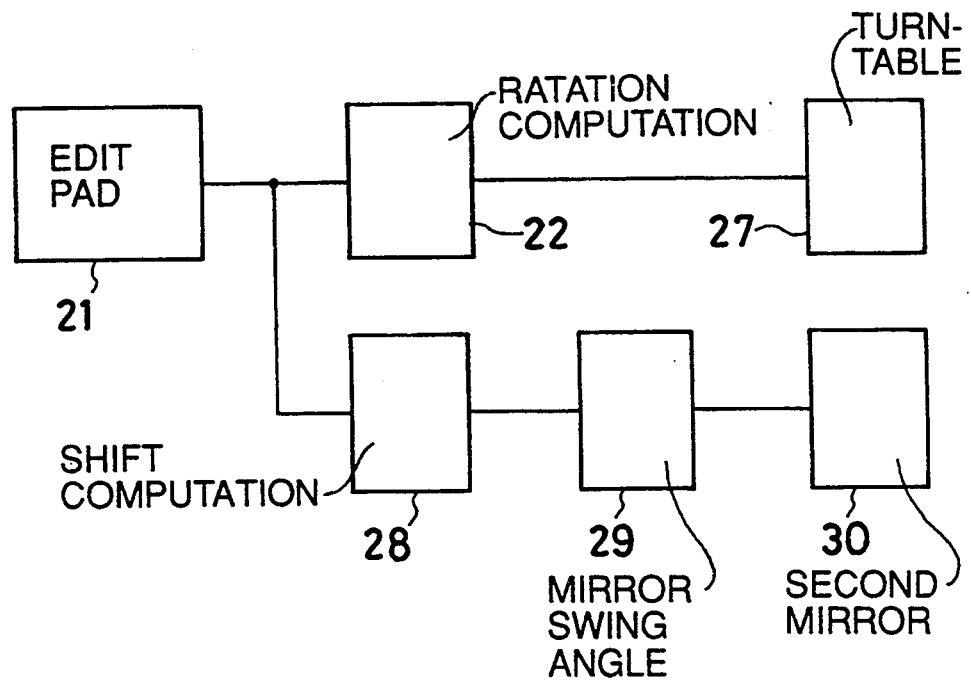
Figure 10A:
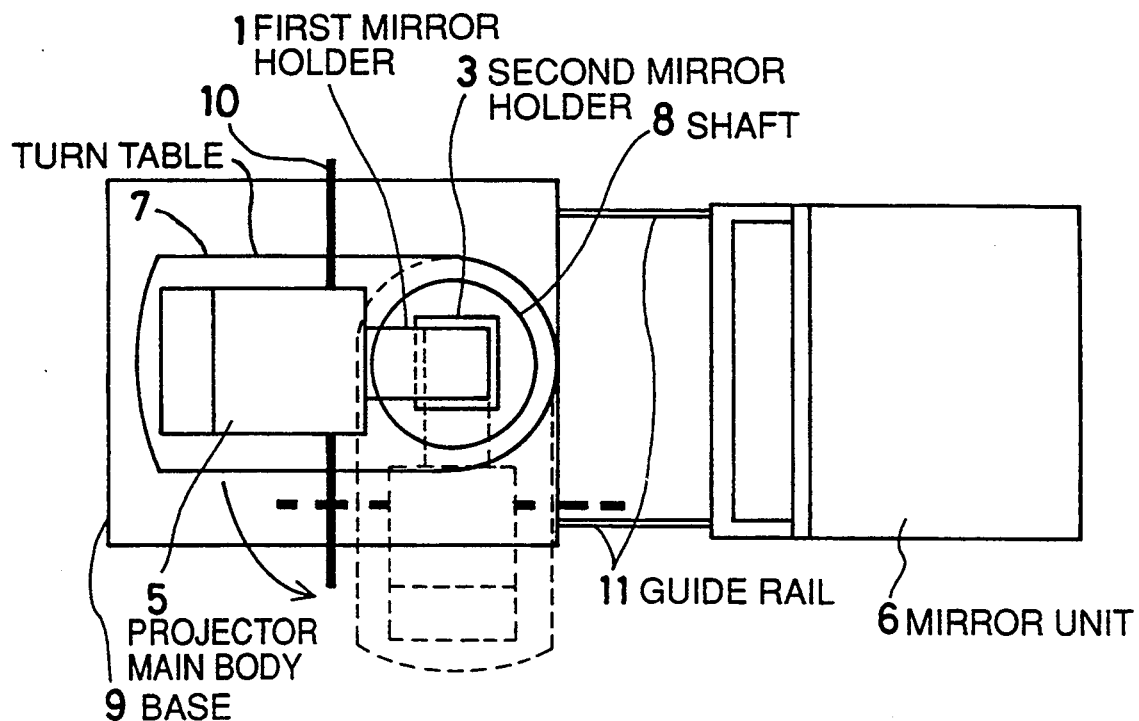
FIGS. 10a and 10b show an arrangement of a film image reading system provided with an LED lamp.
Figure 10B:
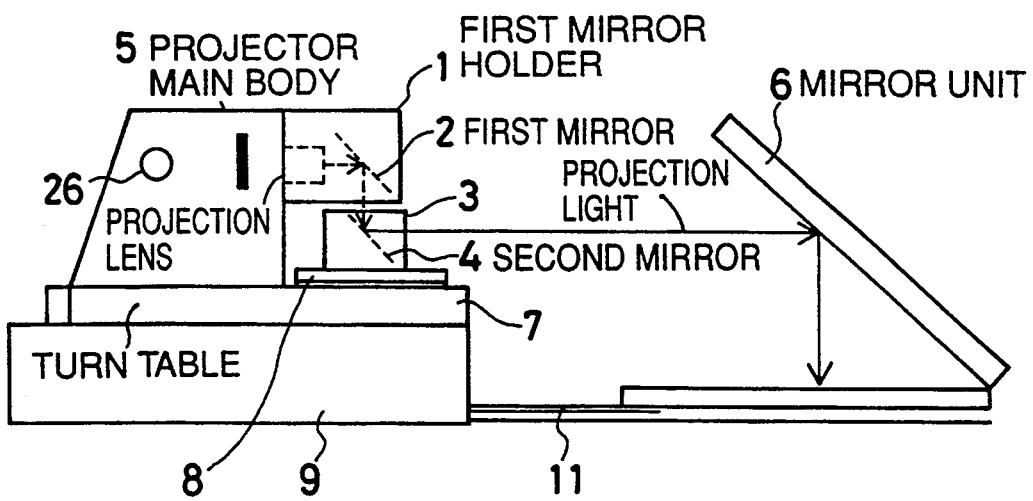

Next, description will be given on a case where the image is rotated. FIG. 6 to FIG. 8 are to explain how to specify rotating information and how to rotate the image. In each of these figures, (a) represents a projected image of a film, (b) is a copy of a projected image, (c) is a projected image rotated by a specified rotating angle, and (d) is an outputted copy. FIG. 9 shows block diagrams of a control system for image rotation, and FIG. 10 is an arrangement of a film image reading system equipped with an LED lamp.

Image rotation is to rotate a projected image by calculating rotating angle of a rotating mechanism and by specifying and inputting rotation information with a copy placed on an edit pad on a copying machine as described above.

Figure 6A:
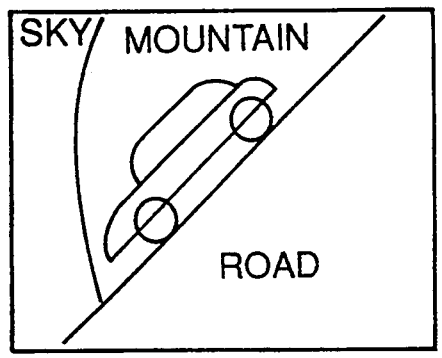
FIGS. 6a. through 6d, FIGS. 7a. through FIG. 7d., and FIGS. 8a. through FIG. 8d. are to explain how rotation information is specified and how image is rotated.
Figure 6B:
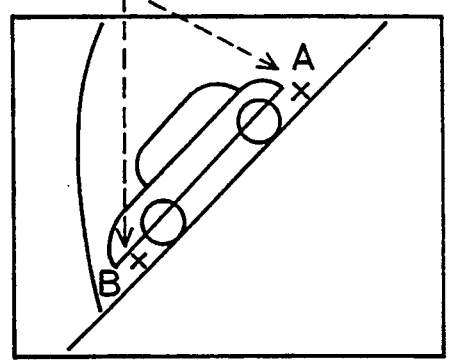
Figure 6C:
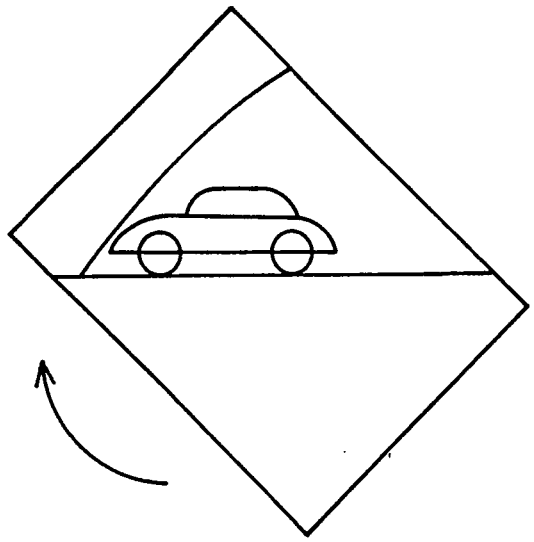
Figure 6D:
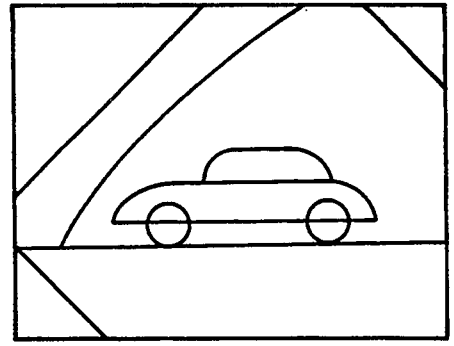
Figure 7A:
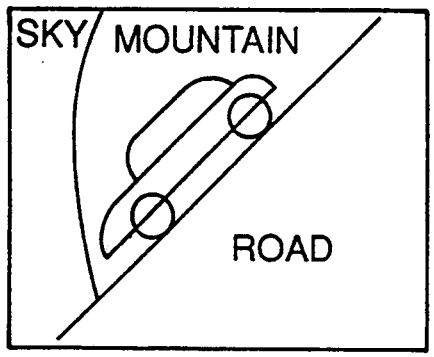
Figure 7B:
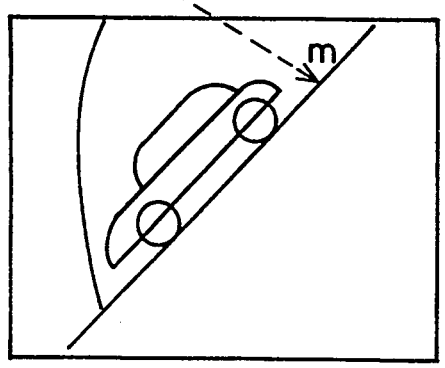
Figure 7C:
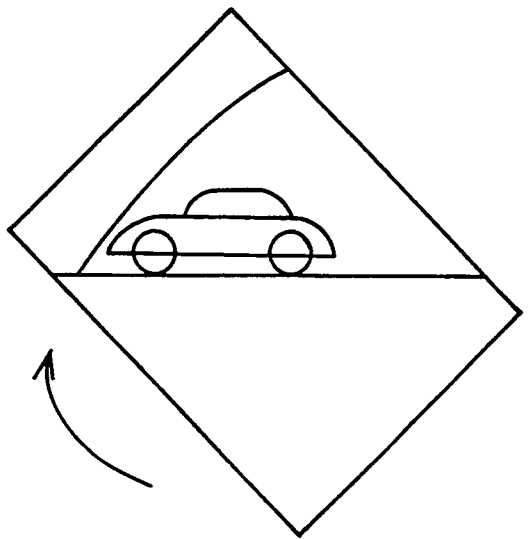
Figure 7D:
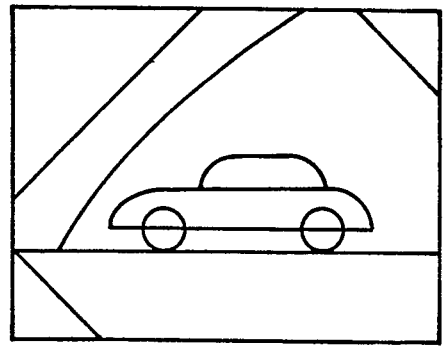

For example, if it is supposed that a projected image of a film of FIG. 6(a) is outputted as a copy as shown in FIG. 6(b), the copy is placed on an edit pad, and a diagonal line to be turned to horizontal line is specified by two points A and B. By specifying these two points, the rotating angle to turn the line connecting the two points to a horizontal line can be obtained. Accordingly, by rotating the turntable of the above film image reading system by this rotating angle, it is possible to obtain a projected image as shown in FIG. 6(c), and this is outputted as a copy of FIG. 6(d).

In this case, the turntable can be rotated and driven automatically by a predetermined rotating angle using a driving motor. Or, the rotating angle may be displayed, and an operator may rotate the turntable according to the display. In particular, in case a driving motor is used, rotation can be made automatically without manual procedure by the operator. However, it is practically difficult to detect the surrounding conditions, e.g. to avoid an accident when the turntable is going to hit an obstacle. The use of a driving motor leads to higher cost. In case the operator rotates, the rotating angle obtained by a computing unit 22 is displayed on a display unit 24 as shown in FIG. 9(a). Actual rotating angle obtained by the operator is detected by a rotating angle sensor 23 and is compared with the rotating angle obtained by a comparator 25. By displaying coincidence/non-coincidence on LED lamp 26, the image can be rotated by simple manipulation. For example, an LED lamp 26 is mounted on the film projector main body as shown in FIG. 10. When the operator manually rotates the turntable, LED lamp 26 is lighted up when the rotation concurs with the rotating angle obtained, and the operator is notified that the desired rotating angle has been obtained.

When the rotating angle is obtained from a line connecting the specified two points as described above, there arise problems that much attention is required to accurately identify horizontal portion of an object or that the accuracy is reduced if roughly specified. In a copy of FIG. 7(b), which is a projected image of a film of FIG. 7(a), by specifying one point on a straight line m, the rotating angle to turn the line to horizontal may be calculated by recognizing the straight line by pre-scanning. In this case, only one point may be specified, and this means simple and easier operation.

Figure 8A:
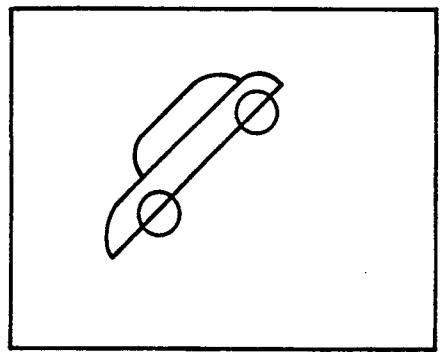
Figure 8B:
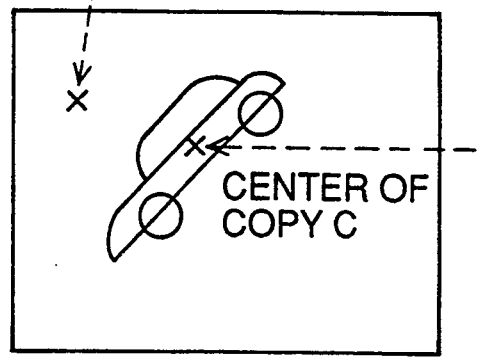
Figure 8C:
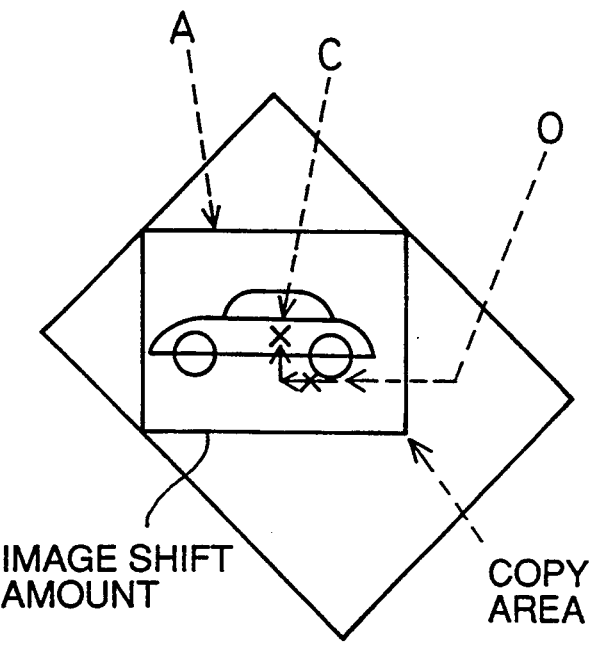
Figure 8D:
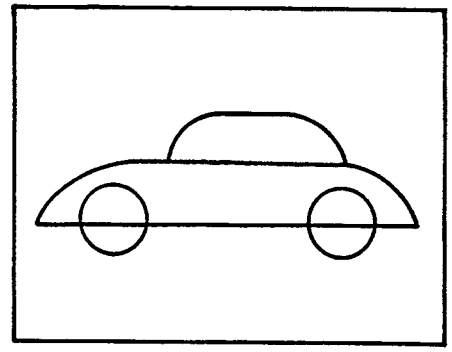

In the above example of image rotation, the rotating center is determined, and the rotated projected image is outputted as copy, while, as shown in FIG. 8(b), the center C (CX, CY) of the outputted copy after image rotation and a point A on a frame of an area may be specified as a copy area. In this case, the image is rotated by rotating the turntable of the film image reading system. Then, the rotating center O (OX, OY) of the projected optical image by the rotated projected image shown in (c), the center (CX', CY') of the outputted copy after image rotation, shift amount of the image from a point A on frame, and scale-up and scale-down ratios are calculated. By shifting and by scaling up or down with the image input terminal and the image processing system, a copy can be obtained as shown in (d). In this case, main scanning direction is determined by data processing of the image processing system, and the processing of sub-scanning direction is achieved by adjusting the reading range or speed of the image input terminal. These processings can be accomplished by an image processing system as already proposed by the present applicant (e.g. Japanese Provisional Patent Publication No. 2-161872). As the copy area, a point on frame of rectangular area to be copied may be specified, while it is needless to say that the scale-up ratio may be given.

As described above, image rotation is performed by rotating the turntable, and shifting and scaling-up are carried out by the image processing system, whereas shifting may be performed by adjusting swing direction angle and twist direction angle of the second mirror instead of the processing by the image processing system. In this case, the shift amount is obtained first by a shift amount computing circuit 28 as shown in FIG. 9(b), and the swing angle and the twist angle of the second mirror are obtained from this shift amount by a mirror swing computing unit 29. By controlling the second mirror adjusting unit 30, the desired shift can be performed.

By image rotation, shifting and scaling-up, position and tilting of an object photographed diagonally or an object deviated to one side can be corrected. In this case, the projected image of the film is turned diagonally, and the portion out of the film area appears on the copy, and image lacking occurs. As the result, particularly when a positive film is copied, the image is turned to black on the copy and looks very poor. Thus, it is necessary to perform interpolation of image data on an image lacking area.

Figure 11A:
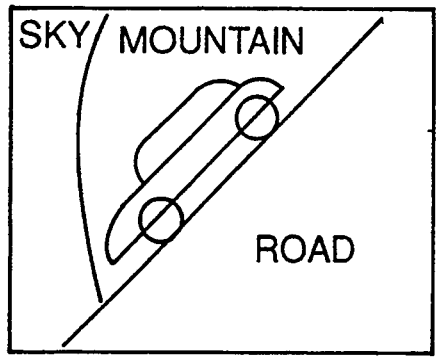
FIGS. 11a through 11d are to explain processing of lacking image at corners of an image.
Figure 11B:
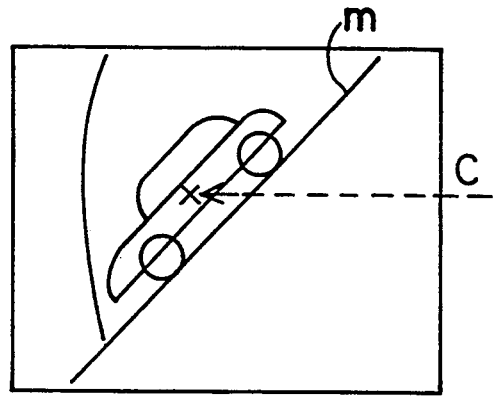
Figure 11C:
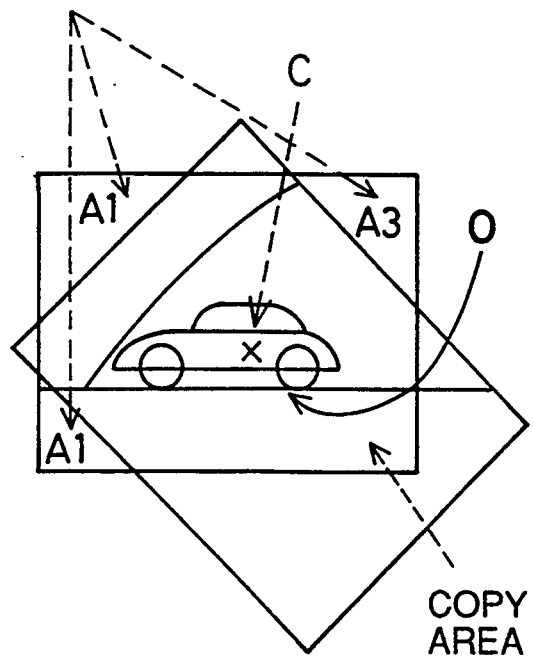
Figure 11D:
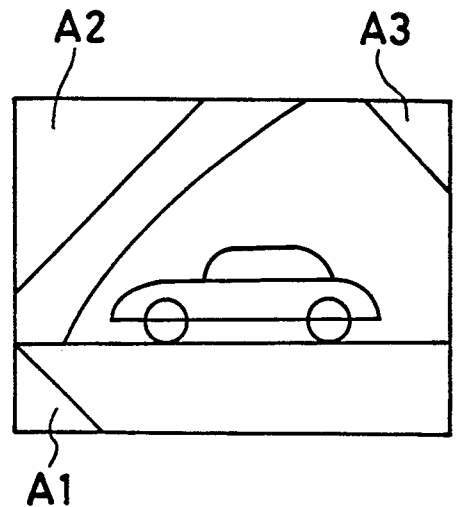

In case the center C of the copy and the refernece line m are specified with a copy (b) of the projected image of FIG. 11(a) placed on the edit pad, the area to be outputted as copy is obtained as shown in FIG. 11(c) when the projected image is rotated, and the image lacking portions A1, A2 and A3 on the copy can be obtained by image rotation. By giving specified color from the registered colors to the image lacking portions A1, A2 and A3, or by sampling a point in the image area and by giving its color as the specified color, the portion in question is painted with the specified color as shown in FIG. 11(d) and a copy is outputted. This painting processing can be achieved by editing function of the image processing system as already proposed by the present applicant (e.g. Japanese Provisional Patent Publication No. 2-22375).

Figure 12A:
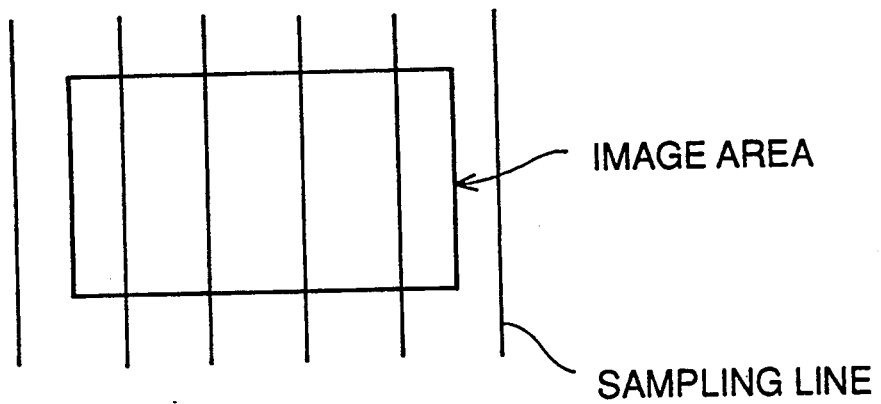
FIGS. 12a and 12b represent the relationship between an image projection area and sampling lines.
Figure 12B:
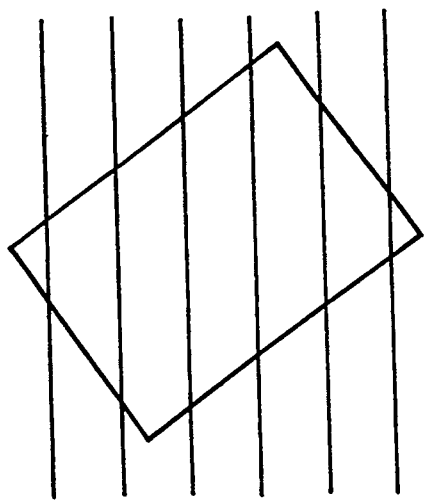

In the film image reading system of the present invention, image can be freely rotated by the turntable, and projected area of the image is changed according to the rotating angle. As the result, scanning area for automatic density adjustment (A/E) is also changed according to the rotating angle, and problem arises that uniform switchover of A/E scan area as in the past cannot cope with this change. In the present invention, therefore, distance between sampling lines and position of sampling point are prepared on the table so that, for example, the distance between the sampling lines is made shorter when rotating angle is tilted as shown in FIGS. 12(a) and (b). Thus, the table is switched over according to the value of a rotating angle sensor on the turntable.

Figure 13A:
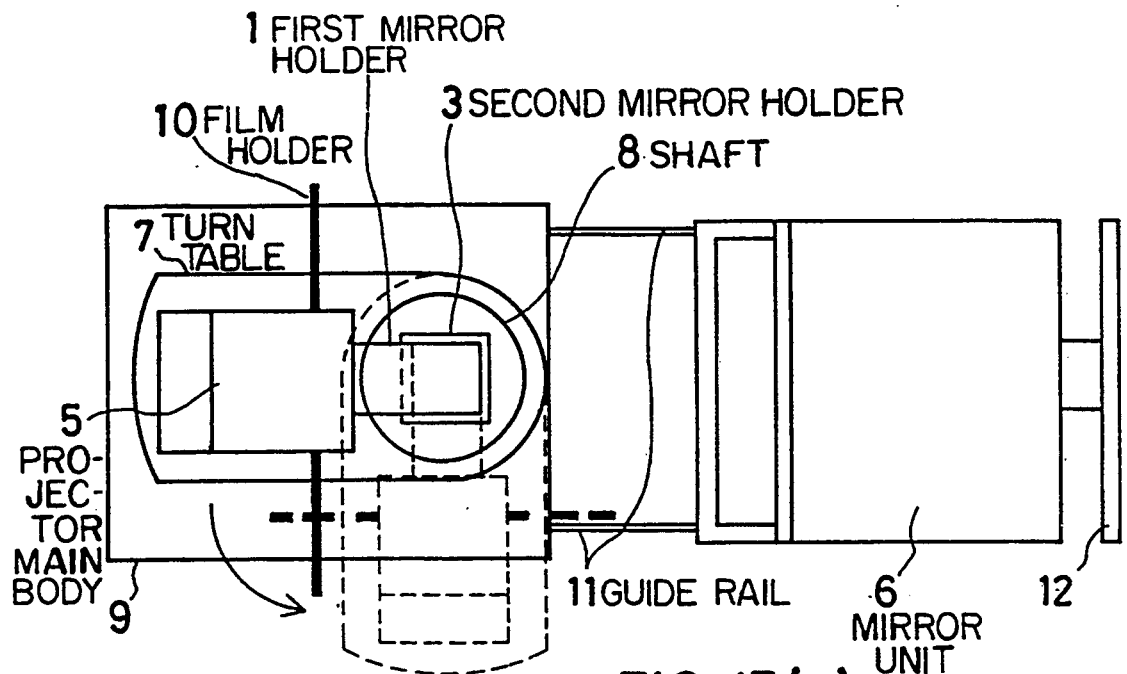
FIGS. 13a through 13c show another embodiment of the film image reading system according to the present invention.

As it is evident from the above description, in the film image reading system of the present invention, the projected image of the film projector main body 5 can be freely rotated. Accordingly, holes for film holder on the housing of the film projector main body 5 may be furnished only on side so that the film holder 10 may be inserted from lateral direction as shown in FIG. 1. As the result, the longitudinal projection mechanism needed in the past is not required, which causes interference with structures below the film projector. Because optical path between the film projector main body 5 and the mirror unit 6 is deflected by two mirrors, the film projector main body 5 moves upward and surplus space is obtained below the film projector main body 5. Thus, as shown in FIG. 13, the base 9 of the film projector main body 5 can be effectively utilized as a space for storing the mirror unit 6.

Figure 13B:
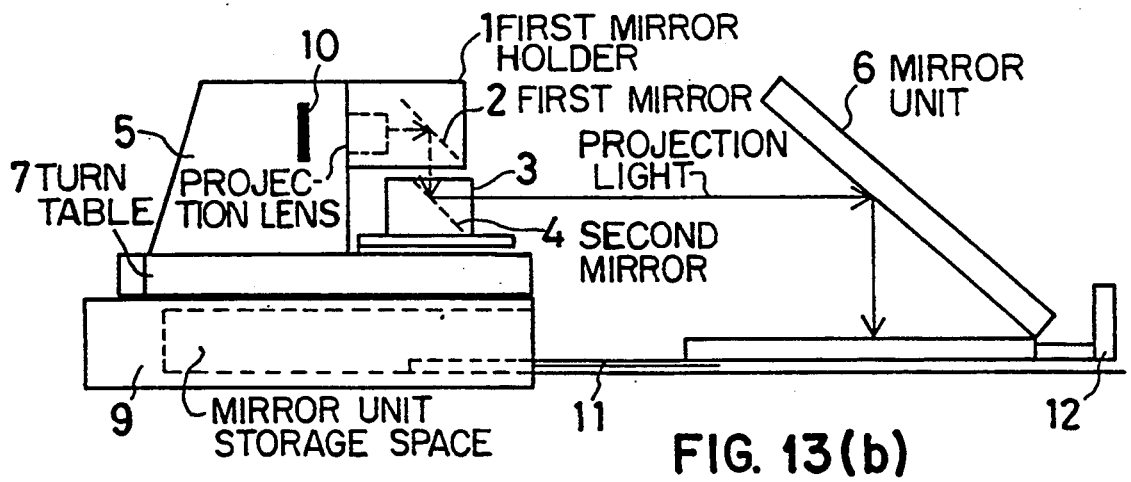
Figure 13C:
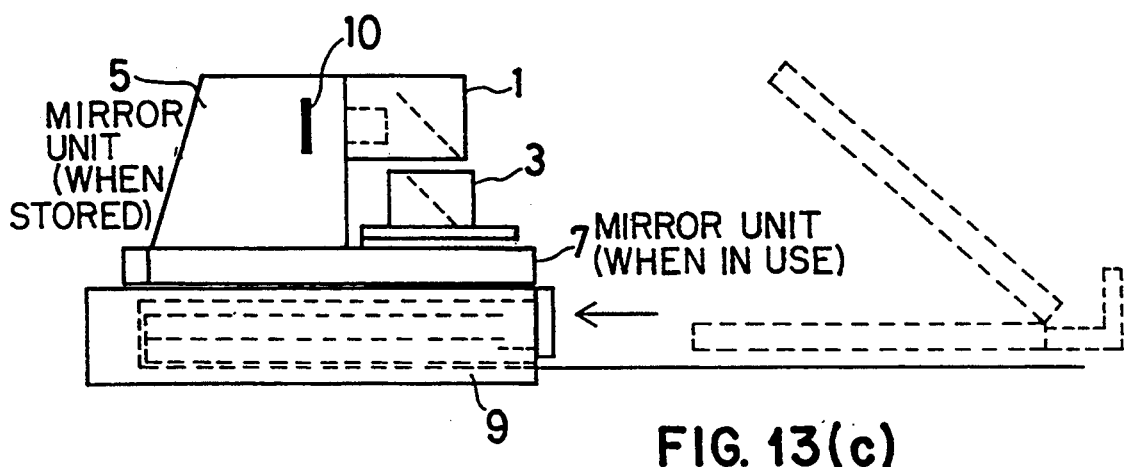

FIG. 13(b) shows the condition when the mirror unit is used, and FIG. 13(c) represents the condition when it is stored. As shown in FIG. 14, a guide rail 11 is hollow, and a guide rail 11' in the mirror unit storage space is inserted into it. It is engaged in a guide rail receiver 11" on the mirror unit and is slided along. That is, it is designed as extension type and can be extended in three steps up to the projecting position, and it can be reduced conveniently to be accommodated in the storage space. The reference numeral 12 is a handle for pulling out the mirror unit and also serves as a storage space cover. 13 represents wheels mounted at the bottom of the mirror unit.

In the above arrangement, when the mirror unit is stored in the base below the film projector and the handle 12, i.e. storage space cover, is pulled, the mirror unit is pulled out along the guide rail up to the projection position. This makes the setting much easier.

Figure 14A:
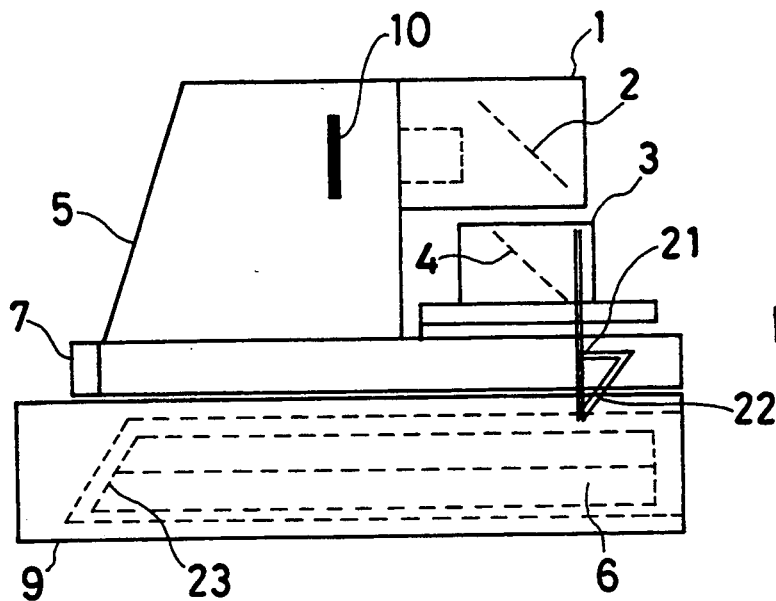
FIGS. 14a through 14c show the arrangement of a guide rail.
Figure 14B:
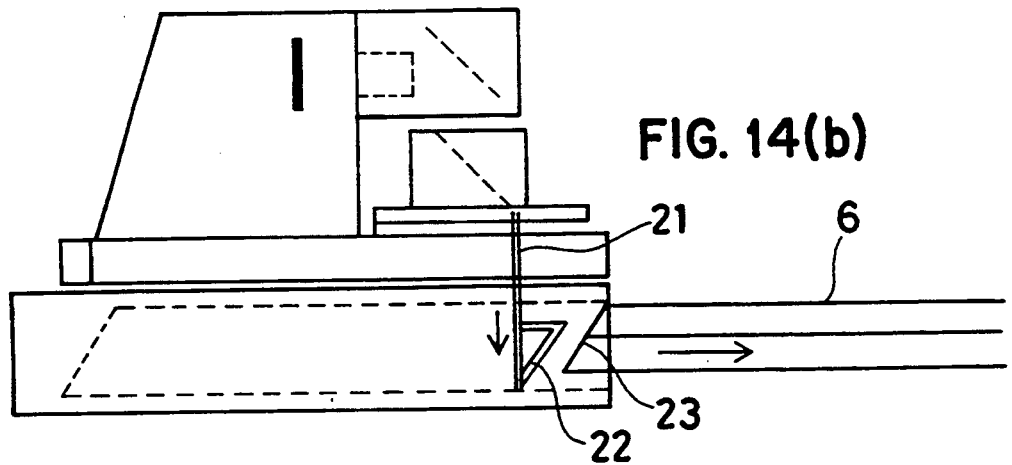
Figure 14C:
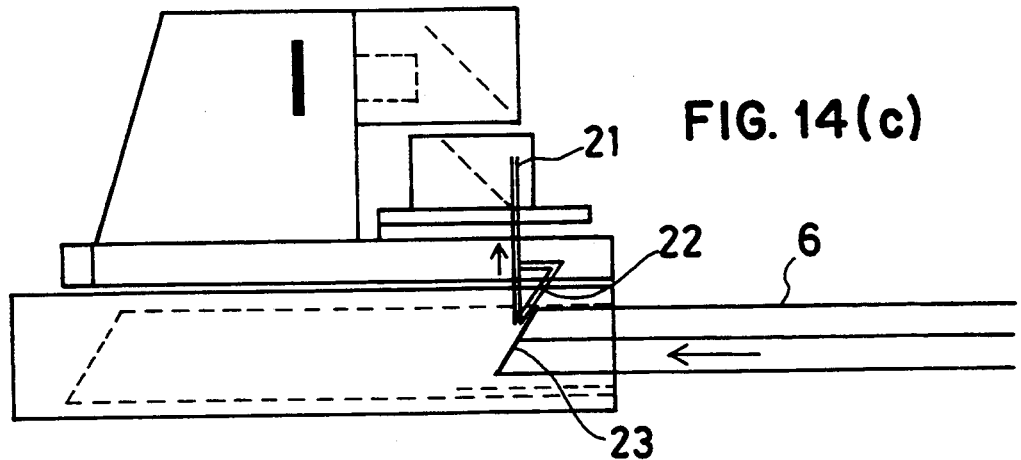
Figure 15:
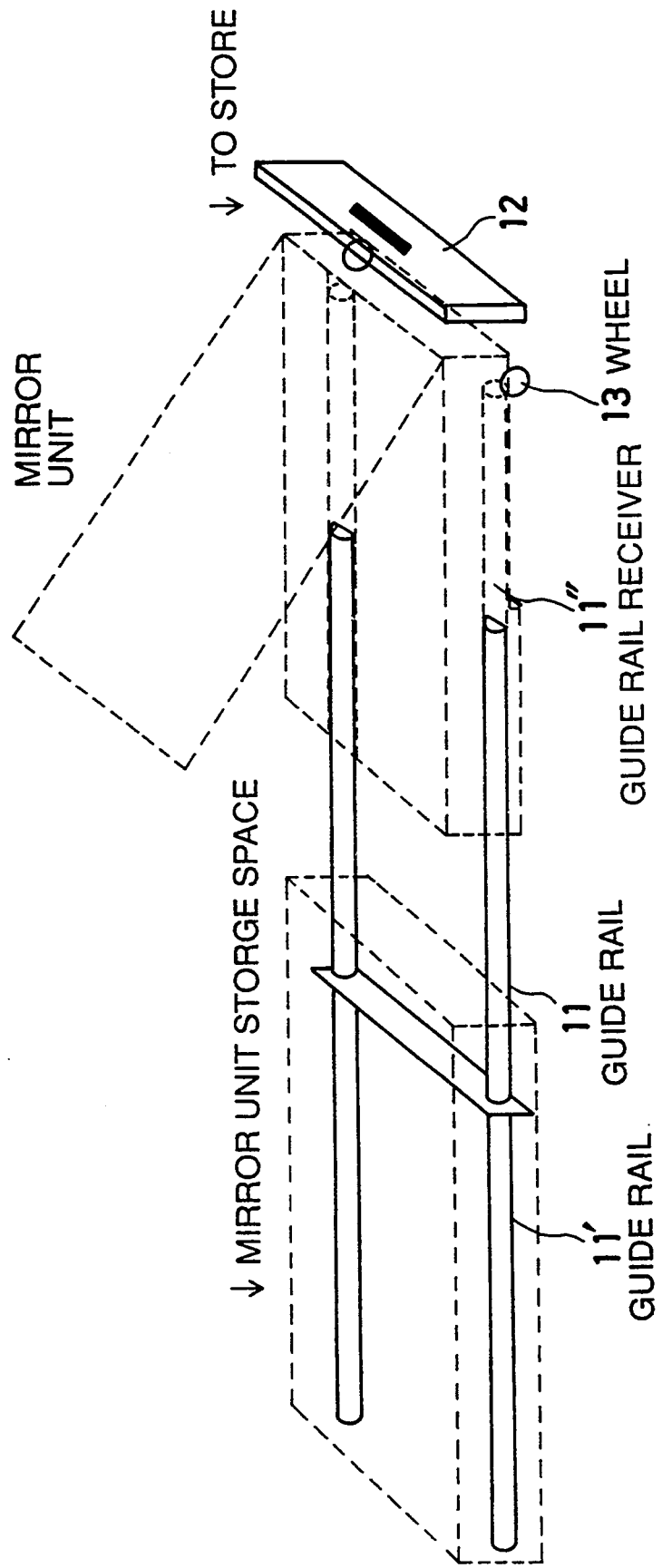
FIG. 15 shows still another embodiment of the film image reading system of the present invention.
Figure 16:
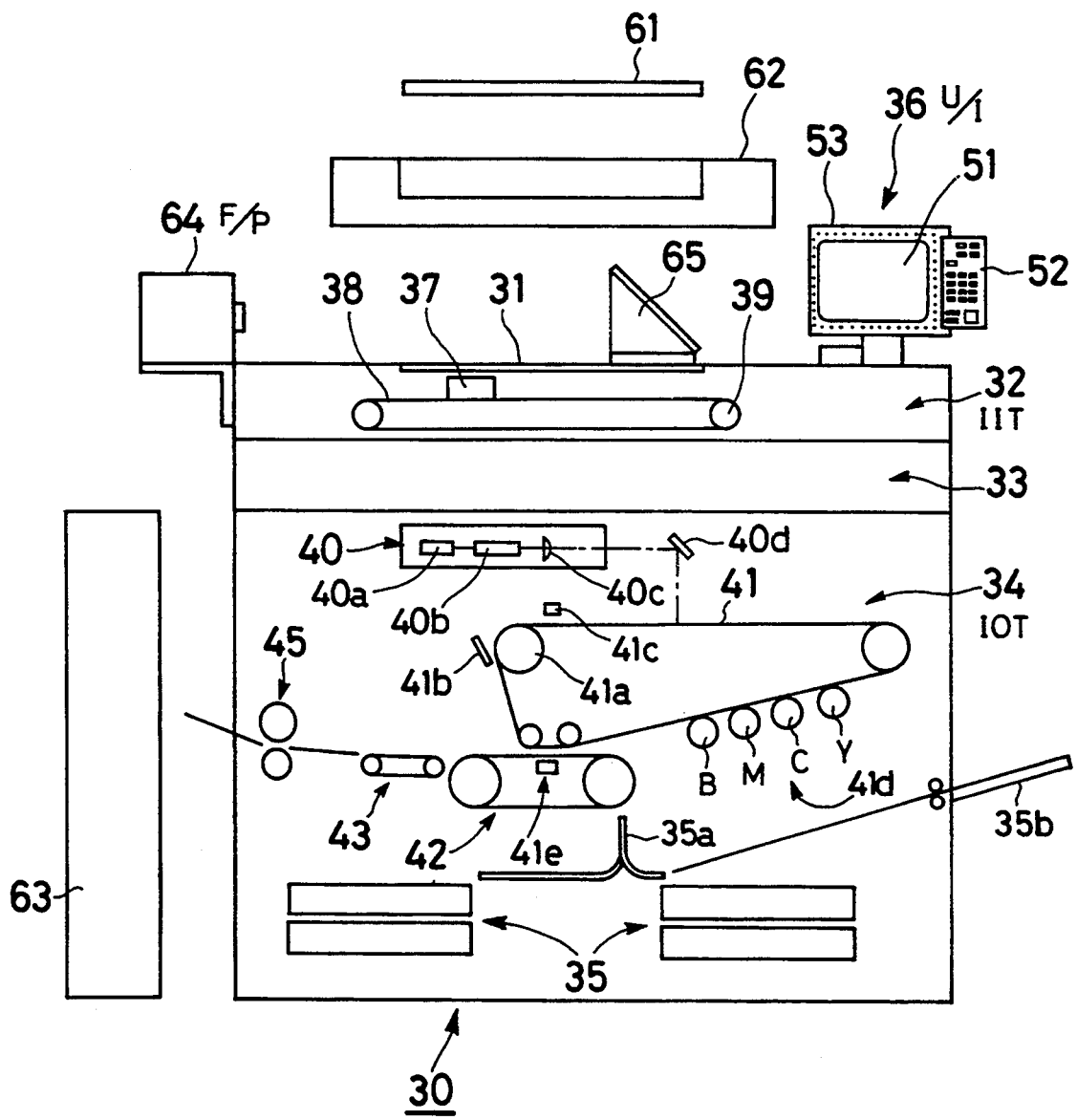
FIG. 16 represents an entire arrangement of a color copying machine equipped with the film image reading system.
Figure 17A:
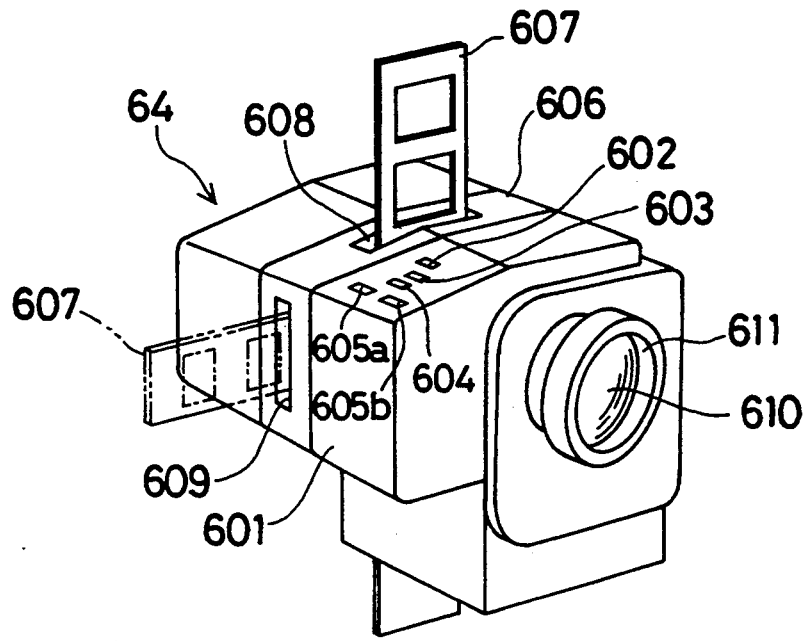
FIGS. 17a and 17b are perspective views of a film projector and a mirror unit constituting the film image reading system.
Figure 17B:
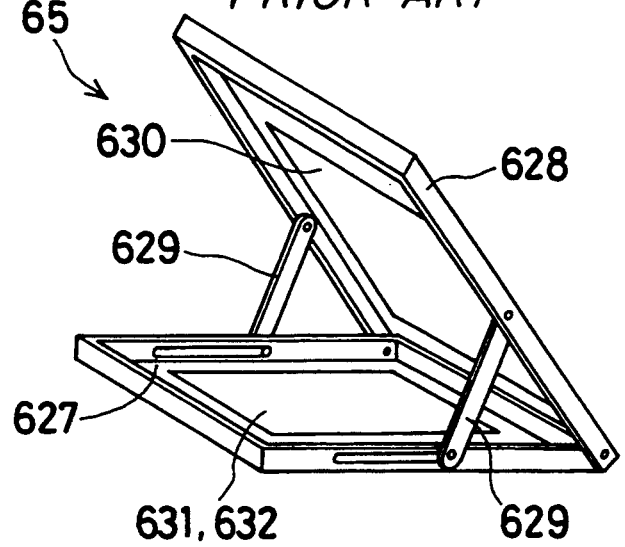
Figure 18:
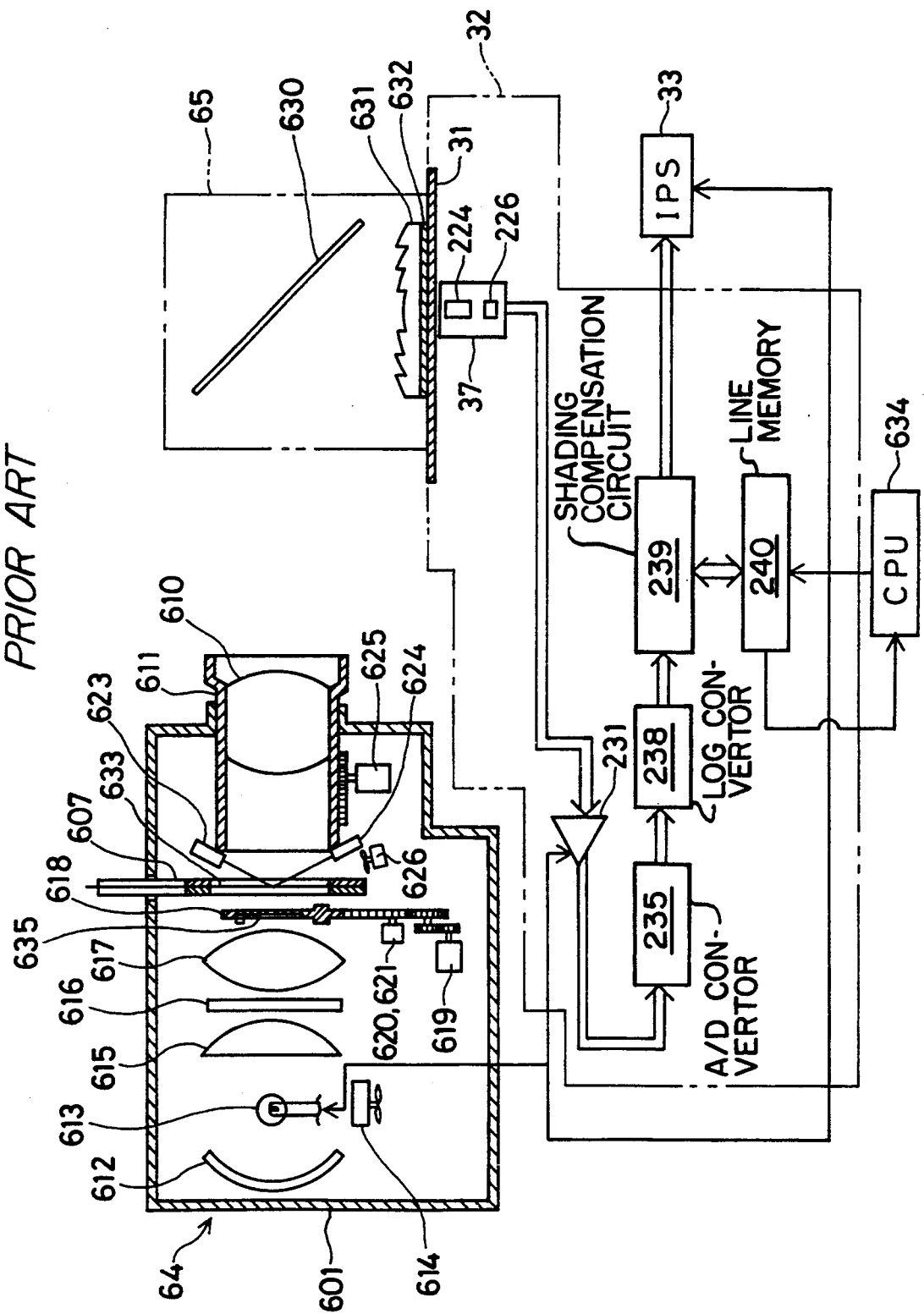
FIG. 18 is a schematical block diagram of the film image reading system.

FIG. 15 shows another embodiment of the film image reading system according to the present invention. A shutter 21 is provided, and front surface of a second mirror holder 3 is moved up and down when the mirror unit 6 is pulled out or stored, and projection optical path is opened or closed. To ensure smooth upward or downward movement of the shutter 21, a tapered portion is provided at lower end of the shutter 21, and another tapered portion 23 is furnished at the tip of the mirror unit 6. When the mirror unit 6 is stored in the base 9 as shown in FIG. 14(a), the shutter 21 is pushed up by the mirror unit 6, and the projection optical path of the second mirror 4 is closed. When the mirror unit 6 is pulled out of the base 9 as shown in FIG. 14(b), the shutter 21 drops and the projection optical path of the second mirror 4 is opened. As shown in FIG. 14(c), when the mirror unit 6 is stored into the base 9, the tapered portions 22 and 23 push against each other, thus moving the shutter 21 up and closing the projection optical path of the second mirror 4.

Because the shutter of the projection optical path is opened or closed when the mirror unit is pulled out of the storage space, error of the operator such as non-removal of lens cap of the film projector by negligence, as often occurred in the past when shading is started with simple setting, can be avoided.

The present invention is not limited to the above embodiments, and various modifications and changes can be made without departing from the spirit or scope of the invention as set forth herein. For example, in the above embodiments, the tapered portions 22 and 23 are used to couple the opening and closing of the shutter in the projection optical path with the storing and pulling out of the mirror unit, while wire may be attached to the mirror unit and may moved up or down in combination with a pulley, or other adequate arrangement may be adopted. The space below the film projection may be utilized for the space to store an object other than the mirror unit.

In the film image reading system of the present invention, the projected image of the film projector main body can be freely rotated. By providing holes for film holder only on the sides and by inserting film from lateral direction, it is possible to obtain diagonal projected image of the film image and to correct the object diagonally taken during film photographing. Further, by specifying the two points, the reference line and the rotating center, the rotating angle can be freely changed, and it is possible to rotate the object diagonally taken during film photographing, to turn it to horizontal direction and to obtain a correct copy. As the result, there is no need to provide a longitudinal projection mechanism used in the past, which causes interference with structures below the film projector, and this leads to more compact design.

Because the optical path between the film projector main body and the mirror unit is deflected by two mirrors, optical path length can be made longer, and it is possible to scale up the projection. Because no longitudinal projection mechanism is required and optical path is deflected, the film projector moves up and there appears surplus space below the film projector main body. As the result, a storage space for the mirror unit can be obtained.

In this case, pulling out and storage of the mirror unit and the setting can be simplified and compact arrangement can be attained by providing an extension type guide rail and a shutter for projection optical path, which can be dropped into the storage space with the mirror unit pulled out and can be pushed up to shield the projection optical path of the first mirror by the tapered portion when the mirror unit is moved to the storage space.

Further, there are provided a focusing function through feedback according to resolution of video signal by the projected image and a focusing function to keep the distance between the film and the lens at constant level by reflected light feedback, and each of these functions can be selectively used. This makes it possible to simplify initial adjustment of auto-focusing, to shorten the processing time, and to improve stability in auto-focusing at copying. Because moving tables are furnished in two steps to provide two focusing functions, one motor will suffice for driving the moving tables by switching over the fixing of the moving tables by an electromagnetic clutch, and this contributes to simplification of the system.

What we claim is:

1. A film image reading system, comprising reading means for reading image information, a film projector for holding a film and projecting an image of said film, a mirror unit for projecting the projected film image from said film projector to said reading means, a first mirror and a second mirror for projecting said projected image from said film projector to said mirror unit by a deflecting optical path between said film projector and said mirror unit, mirror holding means for holding said first and second mirrors, and a base for supporting said film projector and said mirror holding means in place; said second mirror fixed in said mirror holding means, and said first mirror supported for integral rotation movement with said film projector around said second mirror; and adjusting means for adjusting the swing range of said first mirror and the swing range of said second mirror, the swing adjustment range of said first mirror and said second mirror based on a locus of the projected image of film center when said film projector and said first mirror are rotated by a predetermined angle.

2. A film image reading system, comprising reading means for reading image information, a film projector for holding a film and projecting an image of said film, a mirror unit for projecting the projected film image from said film projector to said reading means, a first mirror and a second mirror for projecting said projected image from said film projector to said mirror unit by a deflecting optical path between said film projector and said mirror unit, mirror holding means for holding said first and second mirrors, and a base for supporting said film projector and said mirror holding means in place; said second mirror fixed in said mirror holding means, and said first mirror supported for integral rotation movement with said film projector around said second mirror; and adjusting means for adjusting the swing range of said first mirror and the swing range of said second mirror, the swing adjustment range of said first mirror and said second mirror based on a locus of the projected image of film center when said film projector and said first mirror are rotated by a predetermined angle; and an X-shaped chart projected as a projected image of said film center.

3. A film image reading system, comprising reading means for reading image information, a film projector for holding a film and projecting an image of said film, a mirror unit for projecting the projected film image from said film projector to said reading means, a first mirror and a second mirror for projecting said projected image from said film projector to said mirror unit by a deflecting optical path between said film projector and said mirror unit, mirror holding means for holding said first and second mirrors, and a base for supporting said film projector and said mirror holding means in place; said second mirror fixed in said mirror holding means, and said first mirror supported for integral rotation movement with said film projector around said second mirror; and adjusting means for adjusting the swing range of said first mirror and the swing range of said second mirror, the swing adjustment range of said first mirror and said second mirror based on a locus of the projected image of film center when said film projector and said first mirror are rotated by a predetermined angle; and an X-shaped chart consisting of two or more pairs of lines used as a projected image of said film center.

4. A film image reading system, comprising reading means for reading image information, a film projector for holding a film and projecting an image of said film, a mirror unit for projecting the projected film image from said film projector to said reading means, a first mirror and a second mirror for projecting said projected image from said film projector to said mirror unit by a deflecting optical path between said film projector and said mirror unit, mirror holding means for holding said first and second mirrors, and a base for supporting said film projector and said mirror holding means in place; said second mirror fixed in said mirror holding means, and said first mirror supported for integral rotation movement with said film projector around said second mirror; and adjusting means for adjusting the swing range of said first mirror and the swing range of said second mirror, the swing adjustment range of said first mirror and said second mirror based on a locus of the projected image of film center when said film projector and said first mirror are rotated by a predetermined angle; an X-shaped chart projected as a projected image of said film center; and said X-shaped chart being used and said swing adjustment and an initial adjustment of auto-focusing being performed simultaneously.

5. A film image reading system, comprising reading means for reading image information, a film projector for holding a film and projecting an image of said film, a mirror unit for projecting the projected film image from said film projector to said reading means, a first mirror and a second mirror for projecting said projected image from said film projector to said mirror unit by a deflecting optical path between said film projector and said mirror unit, mirror holding means for holding said first and second mirrors, and a base for supporting said film projector and said mirror holding means in place; and said second mirror fixed in said mirror holding means, and said first mirror supported for integral rotation movement with said film projector around said second mirror; and adjusting means for adjusting the swing range of said first mirror and the swing range of said second mirror, the swing adjustment range of said first mirror and said second mirror based on a locus of the projected image of film center when said film projector and said first mirror are rotated by a predetermined angle; and rotation adjustment settings of adjusting screws of said first mirror and said second mirror providing said swing adjustment ranges.

6. A film image reading system, comprising reading means for reading image information, a film projector for holding a film and projecting an image of said film, a mirror unit for projecting the projected film image from said film projector to said reading means, a first mirror and a second mirror for projecting said projected image from said film projector to said mirror unit by a deflecting optical path between said film projector and said mirror unit, mirror holding means for holding said first and second mirrors, and a base for supporting said film projector and said mirror holding means in place; and said base being a cubicle to be used as a storage space to store said mirror unit.

7. A film image reading system, comprising reading means for reading image information, a film projector for holding a film and projecting an image of said film, a mirror unit for projecting the projected film image from said film projector to said reading means, a first mirror and a second mirror for projecting said projected image from said film projector to said mirror unit by a deflecting optical path between said film projector and said mirror unit, mirror holding means for holding said first and second mirrors, and a base for supporting said film projector and said mirror holding means in place; said base being a cubicle to be used as a storage space to store said mirror unit; and an extension type guide rail provided in said storage space of said base.

8. A film image reading system, comprising reading means for reading image information, a film projector for holding a film and projecting an image of said film, a mirror unit for projecting the projected film image from said film projector to said reading means, a first mirror and a second mirror for projecting said projected image from said film projector to said mirror unit by a deflecting optical path between said film projector and said mirror unit, mirror holding means for holding said first and second mirrors, and a base for supporting said film projector and said mirror holding means in place; and said base being a cubicle to be used as a storage space to store said mirror unit; and a shutter for shielding a projection optical path of said second mirror provided in said base, said shutter dropped in said storage space when the mirror unit is pulled out, and said shutter pushed up to a position to shield the projection optical path of said second mirror when said mirror unit is moved for storage.

9. A film image reading system, comprising reading means for reading image information, a film projector for holding a film and projecting an image of said film, a mirror unit for projecting the projected film image from said film projector to said reading means, a first mirror and a second mirror for projecting said projected image from said film projector to said mirror unit by a deflecting optical path between said film projector and said mirror unit, mirror holding means for holding said first and second mirrors, and a base for supporting said film projector and said mirror holding means in place; said base being a cubicle to be used as a storage space to store said mirror unit; and a turntable for rotating around a shaft and surrounding thereof being provided in said base, said second mirror placed on said shaft, and said film projector main body and said second mirror placed on said turntable.

10. A film image reading system, having a film projector for projecting an image of film held in a projection optical system and used in combination with an image output unit for reading image information by said reading means and for issuing a copy of the image, and a mirror unit for projecting the projected image of said film projector to said reading means, said reading system comprising: a first mirror and a second mirror for projecting said projected image from said film projector by turning optical axis on an optical path between said film projector and said mirror unit, supporting means where said second mirror is fixed said first mirror is rotated integrally with said film projector around said second mirror, projecting image rotation controlling means for copying said projected image from said film projector by said image output unit by projecting the image to said reading means by said mirror unit through said first mirror and said second mirror, and, when rotating information of the image is specified according to said image copy, obtaining a rotating angle from said rotation information to rotate said projected image in accordance therewith; and said projected image rotation controlling means computing rotating angle from tilting angle of a reference line when the reference line is specified on said copy as said rotation information, and said first mirror being rotated.

11. A film image reading system, having a film projector for projecting an image of film held in a projection optical system and used in combination with an image output unit for reading image information by said reading means and for issuing a copy of the image, and a mirror unit for projecting the projected image of said film projector to said reading means, said reading system comprising: a first mirror and a second mirror for projecting said projected image from said film projector by turning optical axis on an optical path between said film projector and said mirror unit, supporting means where said second mirror is fixed and said first mirror is rotated integrally with said film projector around said second mirror, projecting image rotation controlling means for copying said projected image from said film projector by said image output unit by projecting the image to said reading means by said mirror unit through said first mirror and said second mirror, and, when rotating information of the image is specified according to said image copy, obtaining a rotating angle from said rotation information to rotate said projected image in accordance therewith; and said projected image rotation controlling means obtaining rotating angle and shift amount when a reference line and rotating center are specified on said copy as said rotation information, said first mirror rotated by said rotating angle thus obtained, and reading range and speed in said reading means adjusted by said shift amount and image shift and scaling up or down of the reading data are performed.

12. A film image reading system, having a film projector for projecting an image of film held in a projection optical system and used in combination with an image output unit for reading image information by said reading means and for issuing a copy of the image, and a mirror unit for projecting the projected image of said film projector to said reading means, said reading system comprising: a first mirror and a second mirror for projecting said projected image from said film projector by turning optical axis on an optical path between said film projector and said mirror unit, supporting means where said second mirror is fixed and said first mirror is rotated integrally with said film projector around said second mirror, projecting image rotation controlling means for copying said projected image from said film projector by said image output unit by projecting the image to said reading means by said mirror unit through said first mirror and said second mirror, and, when rotating information of the image is specified according to said image copy, obtaining a rotating angle from said rotation information to rotate said projected image in accordance therewith; and said reading means obtaining boundary lines of an image lacking area on said copy from rotating angle of said projected image, and a scan area changing when image information is taken up by pre-scanning.

13. A film image reading system, having a film projector for projecting an image of film held in a projection optical system and used in combination with an image output unit for reading image information by said reading means and for issuing a copy of the image, and a mirror unit for projecting the projected image of said film projector to said reading means, said reading system comprising: a first mirror and a second mirror for projecting said projected image from said film projector by turning optical axis on an optical path between said film projector and said mirror unit, supporting means where said second mirror is fixed and said first mirror is rotated integrally with said film projector around said second mirror, projecting image rotation controlling means for copying said projected image from said film projector by said image output unit by projecting the image to said reading means by said mirror unit through said first mirror and said second mirror, and, when rotating information of the image is specified according to said image copy, obtaining a rotating angle from said rotation information to rotate said projected image in accordance therewith; and said image output unit performing interpolation of image information by obtaining boundary lines of an image lacking area on a copy from rotating angle of the projected image.

14. A film image reading system, having a film projector for projecting an image of film held in a projection optical system and used in combination with an image output unit for reading image information by said reading means and for issuing a copy of the image, and a mirror unit for projecting the projected image of said film projector to said reading means, said reading system comprising: a first mirror and a second mirror for projecting said projected image from said film projector by turning optical axis on an optical path between said film projector and said mirror unit, supporting means where said second mirror is fixed and said first mirror is rotated integrally with said film projector around said second mirror, projecting image rotation controlling means for copying said projected image from said film projector by said image output unit by projecting the image to said reading means by said mirror unit through said first mirror and said second mirror, and, when rotating information of the image is specified according to said image copy, obtaining a rotating angle from said rotation information to rotate said projected image in accordance therewith; and display means for displaying coincidence of rotating angle of said first mirror with the obtained rotating angle of the projected image.

15. A film image reading system, comprising a first moving table for adjusting a distance from a film, a second moving table having a projection lens and moving over said first moving table, a light emitter fixed on said first moving table and irradiating light to said film and a photodetector for receiving reflected light from said film, a first adjusting means for adjusting position of said first moving table to maintain the distance from said film to a constant value using said light emitter and said photodetector, and a second adjusting means for adjusting said second moving table to a position to obtain optimal resolution through feedback of video signal of said reading means.

16. A film image reading system according to claim 15, wherein said first adjusting means and said second adjusting means are provided with a pair of driving means and engaging means, and said driving means is switched over and engaged by said engaging means to perform adjustment and driving.

17. A film image reading system according to claims 15 or 16, wherein the adjustment by said second adjusting means is performed by projecting a special-purpose chart for focus adjustment.

18. A film image reading system, comprising reading means for reading image information, a film projector for holding a film and projecting an image of said film, a mirror unit for projecting the projected film image from said film projector to said reading means, a first mirror and a second mirror for projecting said projected image from said film projector to said mirror unit by a deflecting optical path between said film projector and said mirror unit, mirror holding means for holding said first and second mirrors, and a base for supporting said film projector and said mirror holding means in place; said second mirror fixed in said mirror holding means, and said first mirror supported for integral rotation movement with said film projector around said second mirror; adjusting means for adjusting the swing range of said first mirror and the swing range of said second mirror, the swing adjustment range of said first mirror and said second mirror based on a locus of the projected image of film center when said film projector and said first mirror are rotated by a predetermined angle; an X-shaped chart consisting of two or more pairs of lines used as a projected image of said film center; and said X-shaped chart being used and said swing adjustment and an initial adjustment of autofocusing being performed simultaneously.

* * * * *

UNITED STATES PATENT AND TRADEMARK OFFICE
CERTIFICATE OF CORRECTION

PATENT NO. : 5,335,093
DATED : August 02, 1994
INVENTOR(S) : Yoshiya Imoto

It is certified that error appears in the above-indentified patent and that said Letters Patent is hereby corrected as shown below:

Claim 8, Column 19, Line 67 delete "and".

Claim 12, Column 21, Line 24 change "projecting" to --projected--.

Claim 14, Column 21, Line 67 change "the" to --a--.

Signed and Sealed this

Eleventh Day of April, 1995

Attest:

BRUCE LEHMAN

*Attesting Officer*     *Commissioner of Patents and Trademarks*